US007947154B2

(12) United States Patent
Yazaki et al.

(10) Patent No.: US 7,947,154 B2
(45) Date of Patent: May 24, 2011

(54) SHOE PRESS BELT FOR PAPERMAKING

(75) Inventors: Takao Yazaki, Tokyo (JP); Nobuharu Suzuki, Tokyo (JP); Shintaro Yamazaki, Tokyo (JP); Atsushi Ishino, Tokyo (JP); Yuya Takamori, Tokyo (JP); Ryo Umehara, Tokyo (JP); Ai Tamura, Tokyo (JP)

(73) Assignee: Ichikawa Co., Ltd., Tokyo (JP)

( * ) Notice: Subject to any disclaimer, the term of this patent is extended or adjusted under 35 U.S.C. 154(b) by 0 days.

(21) Appl. No.: 12/866,195

(22) PCT Filed: Feb. 4, 2009

(86) PCT No.: PCT/JP2009/051912
§ 371 (c)(1),
(2), (4) Date: Aug. 4, 2010

(87) PCT Pub. No.: WO2009/099114
PCT Pub. Date: Aug. 13, 2009

(65) Prior Publication Data
US 2010/0314067 A1 Dec. 16, 2010

(30) Foreign Application Priority Data
Feb. 8, 2008 (JP) .................................. 2008-028971

(51) Int. Cl.
*D21F 3/02* (2006.01)
(52) U.S. Cl. ................................... 162/358.4; 162/901
(58) Field of Classification Search .................. 162/306, 162/358.3, 358.4, 901; 442/64–67, 71; 528/59–66
See application file for complete search history.

(56) References Cited

U.S. PATENT DOCUMENTS

| 2004/0029474 A1* | 2/2004 | Watanabe et al. ............. 442/181 |
| 2005/0197478 A1* | 9/2005 | Watanabe ....................... 528/49 |
| 2005/0211533 A1 | 9/2005 | Ishino et al. |
| 2007/0213157 A1* | 9/2007 | Noda ............................. 474/237 |
| 2010/0147480 A1* | 6/2010 | Yazaki et al. ............... 162/358.4 |

(Continued)

FOREIGN PATENT DOCUMENTS
EP    1 338 696    8/2003
(Continued)

OTHER PUBLICATIONS

Decision to Grant a Patent in Patent Application No. 2008-028971, Dispatch No. 312345/1, Dispatch Date May 11, 2010, pp. 1-3 (with English translation).

(Continued)

*Primary Examiner* — Eric Hug
(74) *Attorney, Agent, or Firm* — Oblon, Spivak, McClelland, Maier & Neustadt, L.L.P.

(57) ABSTRACT

A belt for papermaking shoe press is provided which comprises a reinforcing fibrous base (6) and a polyurethane layer (2) united therewith, the reinforcing fibrous base (6) having been embedded in the polyurethane layer (2). The belt includes a polyurethane layer obtained by curing a mixture comprising: a urethane prepolymer obtained by reacting a polyisocyanate compound selected among p-phenylene-diisocyanate, 4,4'-methylene-bis(phenyl isocyanate), and tolylene-diisocyanate with a polyol compound selected among polypropylene glycol, polytetramethylene glycol, and a polycarbonate diol; a hardener selected among an aliphatic diol compound, hydroquinone-bis-β-hydroxyethyl ether, and organic polyamine compound; and an aliphatic triol compound. Due to this layer, the shoe press belt for papermaking is excellent in wearing resistance and flexing fatigue resistance.

18 Claims, 4 Drawing Sheets

U.S. PATENT DOCUMENTS

2010/0186920 A1    7/2010   Yazaki et al.

FOREIGN PATENT DOCUMENTS

| | | | |
|---|---|---|---|
| JP | 5-43645 | * | 2/1993 |
| JP | 2002 146694 | | 5/2002 |
| JP | 2005 120571 | | 5/2005 |
| JP | 3698984 | | 7/2005 |
| JP | 2005 307421 | | 11/2005 |
| JP | 2006 144139 | | 6/2006 |
| JP | 2007 119979 | | 5/2007 |
| JP | 2008 285784 | | 11/2008 |
| JP | 4516610 | | 5/2010 |

OTHER PUBLICATIONS

U.S. Appl. No. 12/718,218, filed Mar. 5, 2010, Yazaki, et al.
EP Search Report issued Feb. 4, 2011 in European Application No. 09 707 877.8.

* cited by examiner

SHOE PRESS BELT FOR PAPERMAKING

TECHNICAL FIELD

The present invention relates to a shoe press belt for use in a papermaking shoe press, and more particularly to a shoe press belt for use in a closed-type shoe press. More specifically, the present invention relates to a shoe press belt for papermaking which has a resin layer of polyurethane having a certain composition and which has excellent mechanical properties in wear resistance, crack resistance, flexural fatigue resistance, etc.

BACKGROUND ART

As shown in FIG. 3, in a shoe press process, a shoe press mechanism comprising a looped shoe press belt 2 interposed between a press roll 1 and a shoe 5 is used, the press roll 1 and the shoe 5 provide a pressing region therebetween through which a transfer felt 3 and a wet paper web 4 are caused to pass so as to dewater the wet paper web 4.

As shown in FIG. 2, the shoe press belt 2 comprises an outer circumferential polyurethane layer 21 and an inner circumferential polyurethane layer 22 which are disposed respectively on both surfaces of a reinforcing fiber base 6 which is sealed (embedded) in the polyurethane layers, wherein the outer circumferential polyurethane layer 21 of the press roll side further has a number of concave grooves 24 defined in its surface, water which is squeezed from the wet paper web 4, when it is pressed in the pressing region, is held in the concave grooves 24, and then the held water is brought out of the pressing region as the shoe press belt rotates. Convex parts 25 on the outer circumferential polyurethane layer 21, which are formed at the press roll side, are required to have their improved mechanical properties such as wear resistance, crack resistance and flexural fatigue resistance, etc. against vertical pressing forces applied by the press roll 1 and wear and flexural fatigue of the shoe press belt in the pressing region.

For the above reasons, polyurethane, which has an excellent crack resistance, is widely used as the resin material of the outer circumferential polyurethane layer 21 of the shoe press belt 2.

For example, patent documents 1 and 2 disclose the shoe press belts comprising a reinforcing fiber base and polyurethane which are integrated each other, the polyurethane comprising an outer circumferential layer and an inner circumferential layer, and the reinforcing fiber base being embedded in the polyurethane, wherein, a polyurethane of the outer circumferential layer is a polyurethane, which has a "JIS (Japanese Industrial Standards) "A" hardness" level ranging from 89 to 94 and which is obtained by curing a mixed composition of an urethane prepolymer (HIPRENE L: trade name, manufactured by Mitsui Chemicals, Inc.) which is obtained by reacting tolylene diisocyanate (TDI) with polytetramethylene glycol (PTMG), and has a terminal isocyanate group, and a curing agent including dimethylthiotoluenediamine, wherein the urethane prepolymer and the curing agent are mixed so that the equivalent ratio (H/NCO) of an active hydrogen group (H) of the curing agent and an isocyanate group (NCO) of the urethane prepolymer has a value in the range of 1<H/NCO<1.15, and wherein a polyurethane of the inner circumferential layer is a polyurethane which is obtained by curing a mixed composition of a urethane prepolymer which is produced by reacting 4,4'-methylene-bis(phenyl isocyanate) (MDI) with polytetramethylene glycol (PTMG), and has a terminal isocyanate group, and a mixed curing agent which comprises 65 parts of dimethylthiotoluenediamine and 35 parts of polytetramethylene glycol (PTMG), wherein the urethane prepolymer and the curing agent are mixed so that the equivalent ratio (H/NCO) of an active hydrogen group (H) of the curing agent and an isocyanate group (NCO) of the urethane prepolymer has a value in the range of 0.85≦H/NCO<1 (see patent document 1 and patent document 2).

Further, patent document 3 discloses a shoe press belt for papermaking in which a reinforcing fiber base and a polyurethane are integrated each other, the polyurethane comprising an outer circumferential layer and an inner circumferential layer and the reinforcing fiber base being embedded in the polyurethane, wherein polyurethane of the outer circumferential layer and the inner circumferential layer are polyurethane, which have a "JIS "A" hardness" level ranging from 94 to 95, formed by curing a mixed composition of a urethane prepolymer (HIPRENE L: trade name, manufactured by Mitsui Chemicals, Inc.) which is produced by reacting tolylenediisocyanate (TDI) with polytetramethylene glycol (PTMG) and has a terminal isocyanate group, and a curing agent including dimethylthiotoluenediamine, wherein the urethane prepolymer and the curing agent are mixed so that the equivalent ratio (H/NCO) of an active hydrogen group (H) of the curing agent and an isocyanate group (NCO) of the urethane prepolymer has a value of 0.97.

(see patent document 3).

Patent document 4 discloses shoe press belts in which a reinforcing fiber base and a polyurethane layer are integrated each other, the reinforcing fiber base being embedded in the polyurethane, wherein the polyurethane is a polyurethane, which has a "JIS "A" hardness" level ranging from 93 to 96, formed by curing a mixed composition of a urethane prepolymer comprising an unreactive polydimethylsiloxane in a liquid form and obtained by reacting tolylene-diisocyanate (TDI) with polytetramethylene glycol (PTMG) and having a terminal isocyanate group, and a curing agent selected from dimethylthiotoluenediamine (ETHACURE300: trade name, manufactured by Albemarle Corporation, USA) and 4,4'-methylene-bis-(2-chloroaniline) (MOCA), wherein the urethane prepolymer and the curing agent are mixed so that the equivalent ratio (H/NCO) is in the range of 0.9≦H/NCO≦1.10, and the shoe press belt, which has a "JIS "A" hardness" level ranging from 90 to 93, is formed by curing a mixed composition of a mixture of a polyurethane having a "JIS "A" hardness" level ranging from 90 to 93 and including unreactive polydimethylsiloxane in a liquid form and a polyurethane having a "JIS "A" hardness" level of 98 and free of unreactive polydimethylsiloxane in a liquid form, and a curing agent of dimethylthiotoluenediamine, wherein the mixture and the curing agent are mixed so that an equivalent ratio is in the range of 0.9≦H/NCO≦1.10 (see patent document 4).

[Patent Document 1] JP, B, 3,698,984
[Patent Document 2] JP, A, 2005-120571
[Patent Document 3] JP, A, 2005-307421
[Patent Document 4] JP, A, 2006-144139

The shoe press belts disclosed in the patent documents 1 to 4 were measured by an inspecting apparatus, in which the opposite ends of a test piece of a belt were gripped by clamp hands, the clamp hands were reciprocally movable horizontally in a ganged fashion, the test piece had an evaluation surface facing a rotating roll, and the press shoe moved toward the rotating roll to press the test piece for measuring crack resistance thereof, while the test piece was subjected to a tensile force of 3 kg/cm and a pressure of 36 kg/cm$^2$ by the inspecting apparatus, the clamp hands were reciprocally moved at a speed of 40 cm/sec., and the number of times that the clamp hands were reciprocally moved was measured until the test piece cracked. As a result, it was found that no crack developed in the test piece after the clamp hands were reciprocally moved 1,000,000 times.

In recent years, as the operating speed has increased, the shoe press belts have had an increased width of about 10 m, and the pressure applied in the pressing region has become higher to meet demands for higher paper productivity growth, the shoe press belts have been used in more and more severe environments, and therefore the various properties of the shoe press belts need to be improved further.

The object of the present invention is to provide a shoe press belt for papermaking which has more excellent mechanical properties in wear resistance, crack resistance, flexural fatigue resistance, etc.

DISCLOSURE OF THE INVENTION

The invention of claim 1 is to provide a shoe press belt for papermaking comprising a reinforcing fiber base and a polyurethane layer which are integral with each other, said reinforcing fiber base being embedded in said polyurethane layer, wherein said polyurethane layer comprises a polyurethane layer produced by curing a mixed composition of a following urethane prepolymer (A) and a following curing agent (B) having an active hydrogen group (H);

said urethane prepolymer (A) obtained by reacting a polyisocyanate compound (a) comprising 55 to 100 molar % of a polyisocyanate compound selected from p-phenylene-diisocyanate, 4,4'-methylene-bis(phenyl isocyanate) and tolylenediisocyanate with a polyol compound (b) selected from polypropylene glycol, polytetramethylene glycol and polycarbonate diol and having a terminal isocyanate group; and said curing agent (B) comprising 75 to 99.9 molar % of a curing agent (B1) selected from an aliphatic diol compound having an active hydrogen group (H) and having a molecular weight in the range from 62 to 1,000, hydroquinone-bis-β hydroxyl ethyl ether and an organic polyamine compound having an active hydrogen group (H) and having a molecular weight in the range from 108 to 1,300, and 25 to 0.1 molar % of an aliphatic triol compound (B2) having an active hydrogen group (H) and having a molecular weight in the range from 92 to 134.

The invention of claim 2 is to provide a shoe press belt for papermaking comprising a reinforcing fiber base and a polyurethane layer which are integral with each other, said reinforcing fiber base being embedded in said polyurethane layer, wherein said polyurethane layer comprises a polyurethane layer produced by curing a mixed composition of a following urethane prepolymer (A) and a following curing agent (B) having an active hydrogen group (H).

said urethane prepolymer (A) obtained by reacting a polyisocyanate compound (a) comprising 55 to 100 molar % of a polyisocyanate compound selected from p-phenylene-diisocyanate, 4,4'-methylene-bis(phenyl isocyanate) and tolylenediisocyanate with a polyol compound (b) selected from polypropylene glycol, polytetramethylene glycol and polycarbonate diol, and having a terminal isocyanate group; and said curing agent (B) comprising 60 to 99.8 molar % of a curing agent ($B1_1$) selected from an aliphatic diol compound having an active hydrogen group (H) and having a molecular weight in the range from 62 to 1,000, and hydroquinone-bis-β hydroxyl ethyl ether, 0.1 to 15 molar % of a curing agent ($B1_2$) selected from an organic polyamine compound having an active hydrogen group (H) and having a molecular weight in the range from 108 to 1,300, and 25 to 0.1 molar % of an aliphatic triol compound (B2) having an active hydrogen group (H) and having a molecular weight in the range from 92 to 134.

The invention of claim 3 is to provide a shoe press belt for papermaking according to claim 1 or 2, wherein said aliphatic diol compound ($B1_1$), included in said component (B) and having the active hydrogen group (H), is an aliphatic diol compound selected from ethylene glycol, 1,3-propanediol, 1,4-butanediol, 1,5-pentanediol, 1,6-hexanediol, polyethylene glycol, polypropylene glycol and polybutylene glycol; and said aliphatic triol compound (B2) having the active hydrogen group (H) is an aliphatic triol compound selected from trimethylolpropane, propanetriol (glycerin), butanetriol, pentanetriol, hexanetriol, cyclopentanetriol and cyclohexanetriol.

The invention of claim 4 is to provide a shoe press belt for papermaking according to claim 1 or 2, wherein said organic polyamine compound ($B1_2$), included in said component (B) and having the active hydrogen group (H), comprises a bifunctional organic diamine compound selected from 3,5-diethyltoluene-2,4-diamine, 3,5-diethyltoluene-2,6-diamine, 3,5-dimethylthiotoluene-2,4-diamine, 3,5-dimethylthiotoluene-2,6-diamine, 4,4'-bis(2-chloroaniline), 4,4'-bis(sec-butylamino)-diphenylmethane, N,N'-dialkyldiaminodiphenylmethane, 4,4'-methylenedianiline, 4,4'-methylene-bis(2,3-dichloroaniline), 4,4'-methylene-bis(2-chloroaniline), 4,4'-methylene-bis(2-ethyl-6-methylaniline), trimethylene-bis(4-aminobenzoate), poly(tetramethylene oxide)-di-p-aminobenzoate, phenylenediamine, polyetherdiamine, isophorone diamine, 4,4'-methylene-bis-(2-methylcyclohexane-1-amine), 4,4'-methylene-bis(cyclohexaneamine), bis(aminomethyl)cyclohexane and xylenediamine.

The invention of claim 5 is to provide a shoe press belt for papermaking according to claim 1 or 2, wherein said organic polyamine compound ($B1_2$), included in said component (B) and having the active hydrogen group (H), comprises an at least tri-functional organic polyamine compound selected from iminobispropylamine, bis(hexamethylene)triamine, triethylenetetramine, tetraethylenepentamine, pentaethylenehexamine, dipropylenetriamine, aminoethylethanolamine, tri(methylamino)hexane and melamine.

The invention of claim 6 is to provide a shoe press belt for papermaking according to claim 1 or 2, comprising a reinforcing fiber base and a polyurethane layer which are integral with each other, said reinforcing fiber base being embedded in said polyurethane layer, and said polyurethane layer comprising an outer circumferential polyurethane layer and an inner circumferential polyurethane layer;

wherein said outer circumferential polyurethane layer is made of said polyurethane layer recited in claim 1 or 2; and said inner circumferential polyurethane layer is made of a polyurethane layer produced by curing a composition comprising a terminal isocyanate group-containing urethane prepolymer obtained by reacting 4,4'-methylene-bis (phenyl isocyanate) with a polyol compound selected from polypropylene glycol, polytetramethylene glycol and polycarbonate diol, and a curing agent selected from 3,5-diethyltoluenediamine, 3,5-dimethylthiotoluenediamine and 1,4-butanediol; or a polyurethane layer produced by curing a composition comprising a terminal isocyanate group-containing urethane prepolymer obtained by reacting a polyisocyanate compound selected from 2,4-tolylene-diisocyanate and 2,6-tolylene-diisocyanate with a polyol compound selected from polypropylene glycol and polytetramethylene glycol, and an organic diamine compound selected from 3,5-diethyltoluenediamine and 3,5-dimethylthiotoluenediamine.

The invention of claim 7 is to provide a shoe press belt for papermaking according to claim 1 or 2, comprising a reinforcing fiber base and a polyurethane layer which are integral with each other, said reinforcing fiber base being embedded in said polyurethane layer, said polyurethane layer comprising an outer circumferential polyurethane layer, an intermediate polyurethane layer and an inner circumferential polyurethane layer, and said outer circumferential polyurethane layer and said inner circumferential polyurethane layer being disposed on respective both sides of said intermediate polyurethane layer;

wherein said outer circumferential polyurethane layer is made of said polyurethane layer recited in claim 1 or 2;

said reinforcing fiber base is embedded in said intermediate polyurethane layer; and said intermediate polyurethane layer and said inner circumferential polyurethane layer are made of a polyurethane layer produced by curing a composition comprising a terminal isocyanate group-containing urethane prepolymer obtained by reacting 4,4'-methylene-bis (phenyl isocyanate) with a polyol compound selected from polypropylene glycol, polytetramethylene glycol and polycarbonate diol, and a curing agent selected from 3,5-diethyltoluenediamine, 3,5-dimethylthiotoluenediamine and 1,4-butanediol; or a polyurethane layer produced by curing a composition comprising a terminal isocyanate group-containing urethane prepolymer obtained by reacting a polyisocyanate compound selected from 2,4-tolylene-diisocyanate and 2,6-tolylene-diisocyanate with a polyol compound selected from polypropylene glycol and polytetramethylene glycol, and an organic diamine compound selected from 3,5-diethyltoluenediamine and 3,5-dimethylthiotoluenediamine.

The invention of claim 8 is to provide a shoe press belt for papermaking according to claim 1 or 2, comprising a reinforcing fiber base and a polyurethane layer which are integral with each other, said reinforcing fiber base being embedded in said polyurethane layer, and said polyurethane layer comprising an outer circumferential polyurethane layer and an inner circumferential polyurethane layer;

wherein said inner circumferential polyurethane layer is made of said polyurethane layer recited in claim 1 or 2; and said outer circumferential polyurethane layer is made of a polyurethane layer produced by curing a composition comprising a terminal isocyanate group-containing urethane prepolymer obtained by reacting 4,4'-methylene-bis (phenyl isocyanate) with a polyol compound selected from polypropylene glycol, polytetramethylene glycol and polycarbonate diol, and a curing agent selected from 3,5-diethyltoluenediamine, 3,5-dimethylthiotoluenediamine and 1,4-butanediol; or a polyurethane layer produced by curing a composition comprising a terminal isocyanate group-containing urethane prepolymer obtained by reacting a polyisocyanate compound selected from 2,4-tolylene-diisocyanate and 2,6-tolylene-diisocyanate with a polyol compound selected from polypropylene glycol and polytetramethylene glycol, and an organic diamine compound selected from 3,5-diethyltoluenediamine and 3,5-dimethylthiotoluenediamine.

A mixed composition of the urethane prepolymer (A), in which a polyisocyanate compound (a) includes 55 to 100 molar % of a polyisocyanate compound selected from p-phenylene-diisocyanate, 4,4'-methylene-bis(phenyl isocyanate) and tolylene-diisocyanate, and a polyol compound (b) selected from polypropylene glycol, polytetramethylene glycol and polycarbonate diol, and the curing agent (B) having an active hydrogen group (H), in which 75 to 99.9 molar % of a curing agent (B1) selected from an aliphatic diol compound having a molecular weight in the range from 62 to 1,000, hydroquinone-bis-β hydroxyl ethyl ether, and an organic polyamine compound having a molecular weight in the range from 108 to 1,300, and also includes 25 to 0.1 molar % of an aliphatic triol compound (B2) having an active hydrogen group (H) and having a molecular weight in the range from 92 to 134, are used as a main component in the outer circumferential polyurethane layer facing the wet paper web; thus, the polyurethane which has an excellent wear resistance can be obtained for the sake of the effect of the aliphatic triol compound, and the shoe press belt for papermaking which exhibits excellent mechanical properties in crack resistance and flexural fatigue resistance can be obtained. Accordingly, the durability of the shoe press belt according to the present invention is expected to be 1.5 times or greater than the durability (normally 2 to 3 months) of shoe press belts according to the background art.

BEST MODE FOR CARRYING OUT THE INVENTION

Embodiments of the present invention will be described in detail below with reference to the drawings.

Figure 1:
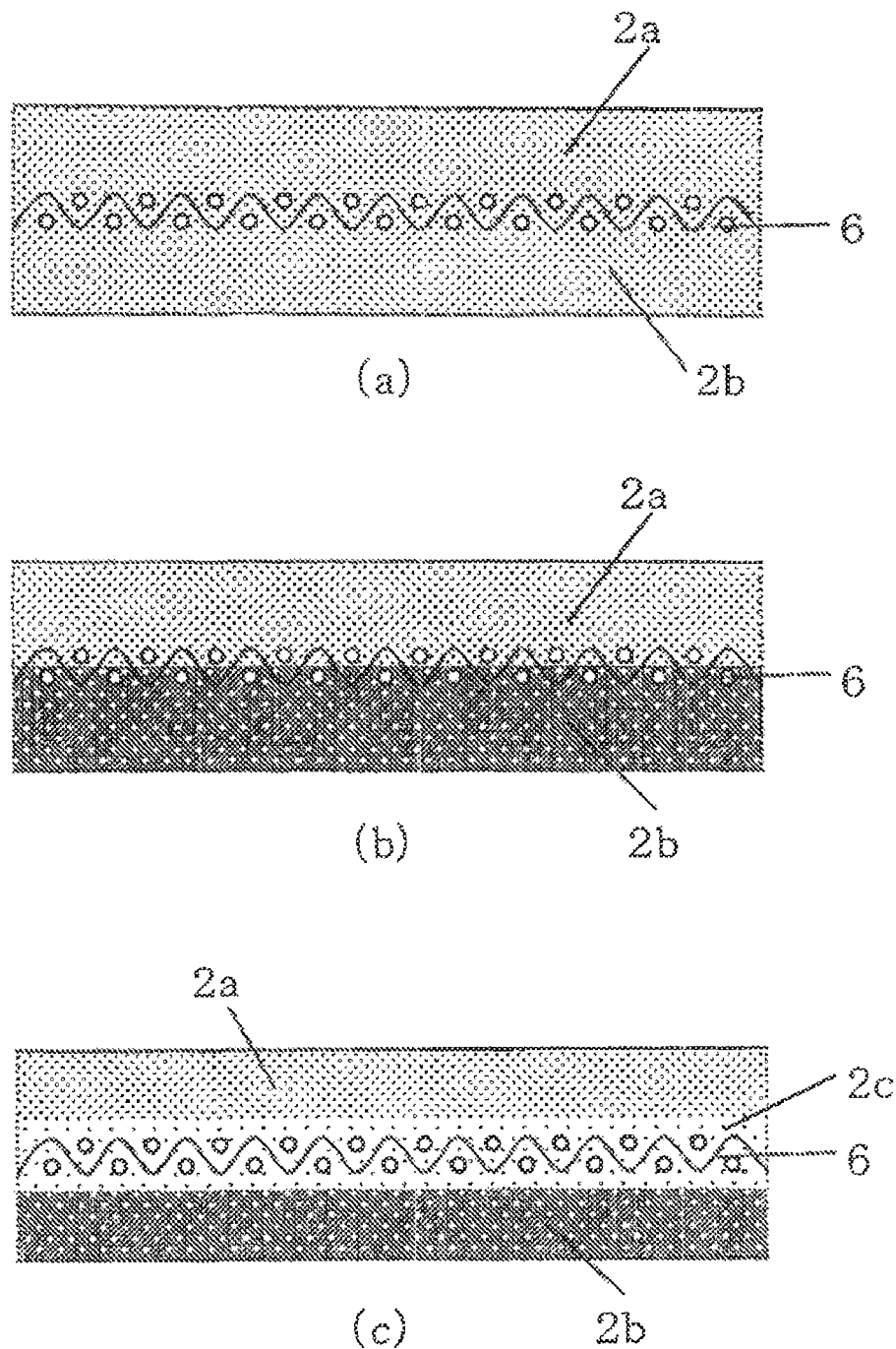
FIG. 1 is a cross-sectional view of a shoe press belt.

FIG. 1 is cross-sectional view of shoe press belts for papermaking according to the present invention, in each of the belts, a reinforcing fiber base and a polyurethane layer are integrated each other, and the reinforcing fiber base is embedded in the polyurethane layer. The shoe press belt shown in FIG. 1(a) includes a single polyurethane layer, the shoe press belt shown in FIG. 1(b) includes a polyurethane layer of two-layer structure comprising an outer circumferential layer 2a and an inner circumferential layer 2b, and the shoe press belt shown in FIG. 1(c) includes a polyurethane layer of three-layer structure comprising an outer circumferential layer 2a, an intermediate layer 2c, and an inner circumferential layer 2b.

In either one of the shoe press belts, the outer polyurethane circumferential layer 2a, of the shoe press belt, facing the wet paper web is preferably made of the polyurethane, which has a "JIS "A" hardness" level ranging from 92 to 100, obtained by heat curing at 70 to 140° C. for 2 to 20 hours, a mixed composition of a urethane prepolymer (A) obtained by reacting a polyisocyanate compound (a) comprising 55 to 100 molar % of a polyisocyanate compound selected from p-phenylene-diisocyanate, 4,4'-methylene-bis(phenyl isocyanate) and tolylene-diisocyanate with a polyol compound (b) selected from polypropylene glycol, polytetramethylene glycol and polycarbonate diol, and has a terminal isocyanate group, and a curing agent (B) comprising 75 to 99.9 molar % of a curing agent (B1) selected from an aliphatic diol compound having an active hydrogen group (H) and having a molecular weight in the range from 62 to 1,000, hydroquinone-bis-β hydroxylethyl ether, and an organic polyamine compound having an active hydrogen group (H) and having a molecular weight in the range from 108 to 1,300, and 25 to 0.1 molar % of an aliphatic triol compound (B2) having an active hydrogen group (H) and having a molecular weight in the range from 92 to 134, wherein the urethane prepolymer (A) and the curing agent (B) are mixed such that the equivalent ratio (H/NCO) of the active hydrogen group (H) of the curing agent (B) and the isocyanate group (NCO) of the urethane prepolymer (A) has a value in the range of 0.88≦H/NCO≦1.12.

As the reinforcing fiber base 6, not only a woven fabric disclosed in the patent documents 1 to 4 but also a reinforcing fiber base disclosed in other documents may be used. For example, the reinforcing fiber base 6 is a grid-like web made of CMD (Cross Machine Direction) yarns comprising multifilament twisted yarns of 5,000 [dtex] made of polyethylene terephthalate (PET) and MD (Machine Direction) yarns comprising multifilament yarns of 550 [dtex], wherein the MD yarns are sandwiched by the CMD yarns and the crossings of the MD yarns and the CMD yarns are joined by a polyurethane adhesive. As a fiber material, aramid fibers or polyamide fibers such as Nylon 6,6, Nylon 6,10, Nylon 6, or the like may be used, instead of the polyethylene terephthalate. The MD yarns and the CMD yarns may be made of different fiber materials from each other, or may have different thicknesses such that one of them has a thickness of 800 [dtex] and the other a thickness of 7,000 [dtex].

The polyurethane of the outer circumferential layer 2a of the shoe press belt is a polyurethane layer produced by curing a mixed composition of a following urethane prepolymer (A) and a following curing agent (B) having an active hydrogen group (H), wherein the urethane prepolymer (A) and the curing agent (B) are mixed such that the equivalent ratio (H/NCO) of the active hydrogen group (H) of the curing agent and the isocyanate group (NCO) of the urethane prepolymer has a value in the range of 0.88≦H/NCO≦1.12.

An urethane prepolymer (A) obtained by reacting a polyisocyanate compound (a) comprising 55 to 100 molar % of a polyisocyanate compound selected from p-phenylene-diisocyanate, 4,4'-methylene-bis(phenyl isocyanate) and tolylene-diisocyanate with a polyol compound (b) selected from polypropylene glycol, polytetramethylene glycol and polycarbonate diol, and having a terminal isocyanate group.

A curing agent (B) comprising 75 to 99.9 molar % of a curing agent (B1) selected from an aliphatic diol compound having an active hydrogen group (H) and having a molecular weight in the range from 62 to 1,000, hydroquinone-bis-β hydroxylethyl ether and an organic polyamine compound having an active hydrogen group (H) and having a molecular weight in the range from 108 to 1,300, and 25 to 0.1 molar % of an aliphatic triol compound (B2) having an active hydrogen group (H) and having a molecular weight in the range from 92 to 134.

A polyisocyanate compound selected from p-phenylene-diisocyanate (PPDI), 4,4'-methylene-bis(phenyl isocyanate) (MDI) and tolylene-diisocyanate (TDI) may be used 55 to 100 molar %, preferably 75 molar % or more, as primary component in the polyisocyanate compounds (a), which is a material of the urethane prepolymer (A). Less than 45 molar %, preferably less than 25 molar %, of polyisocyanate compounds other than PPDI, MDI and TDI may be used in combination.

A high molecular weight polyol compound selected from polypropylene glycol, polytetramethylene glycol and polycarbonate diol may be used 65 to 100 molar %, preferably 85 molar % or more, in the polyol compound (b), which is a material of the urethane prepolymer (A). Less than 35 molar %, preferably less than 15 molar %, of polyol compounds other than the above polyol compounds such as polyethylene adipate (PEA), polycaprolactone diol (PCL), etc. may be used in combination.

75 to 99.9 molar %, preferably 80 to 99.5 molar %, of a curing agent (B1) selected from an aliphatic diol compound having an active hydrogen group (H) and having a molecular weight in the range from 62 to 1,000, hydroquinone-bis-β hydroxyl ethyl ether and an organic polyamine compound having an active hydrogen group (H) and having a molecular weight in the range from 108 to 1,300 is used as a primary component of the curing agent (B). 25 to 0.1 molar %, preferably 20 to 0.5 molar %, of an aliphatic triol compound (B2) having an active hydrogen group (H) and having a molecular weight in the range from 92 to 134 is used as a subsidiary component of the curing agent. When the proportion of the aliphatic triol compound (B2) is smaller than 0.1 molar %, the wear resistance of polyurethane less increased, and when the proportion is greater than 25 molar %, the flexural resistance of polyurethane is less increased than commercially available polyurethanes.

The shoe press belt may have a single polyurethane layer of the present invention as shown in FIG. 1(a) or may be of a multilayer structure, in which a polyurethane of the present invention is used in part, as shown in FIG. 1(b) and FIG. 1(c).

For example, the shoe press belt for papermaking shown in FIG. 1(b) is a belt for paper making comprising the reinforcing fiber base and the polyurethane layer which are integral with each other, the reinforcing fiber base being embedded in the polyurethane layer, the polyurethane layer comprising the outer circumferential polyurethane layer 2a and the inner circumferential polyurethane layer 2b, wherein the outer circumferential polyurethane layer 2a is a polyurethane produced by heat-curing a mixed composition of the following urethane prepolymer (A) and the curing agent (B) having the active hydrogen group (H) at 70 to 140° C. for 2 to 20 hours and having a "JIS "A" hardness" level ranging from 92 to 100, and wherein the urethane prepolymer (A) and the curing agent (B) are mixed such that the equivalent ratio (H/NCO) of the active hydrogen group (H) of the curing agent and the isocyanate group (NCO) of the urethane prepolymer (A) has a value in the range of $0.88 \leq H/NCO \leq 1.12$.

The urethane prepolymer (A) obtained by reacting a polyisocyanate compound (a) including 55 to 100 molar % of a polyisocyanate compound selected from p-phenylene-diisocyanate, 4,4'-methylene-bis(phenyl isocyanate) and tolylenediisocyanate with a polyol compound (b) selected from polypropylene glycol, polytetramethylene glycol and polycarbonate diol and having a terminal isocyanate group.

The curing agent (B) comprising 75 to 99.9 molar % of a curing agent (B1) selected from an aliphatic diol compound having an active hydrogen group (H) and having a molecular weight in the range from 62 to 1,000, hydroquinone-bis-β hydroxyl ethyl ether and an organic polyamine compound having an active hydrogen group (H) and having a molecular weight in the range from 108 to 1,300, and 25 to 0.1 molar % of an aliphatic triol compound (B2) having an active hydrogen group (H) and having a molecular weight in the range from 92 to 134.

The curing agent (B1) may include 60 to 99.8 molar % of a curing agent (B1$_1$), which is selected from an aliphatic diol compound having an active hydrogen group (H) and having a molecular weight in the range from 62 to 1,000 and hydroquinone-bis-β hydroxyl ethyl ether, in combination with 0.1 to 15 molar % of a curing agent (B1$_2$), which is selected from an organic polyamine compound having an active hydrogen group (H) and having a molecular weight in the range from 108 to 1,300.

The polyurethane of the inner circumferential polyurethane layer 2b is a polyurethane produced by heat-curing a mixed composition of a urethane prepolymer, which is obtained by reacting a polyisocyanate compound selected from 2,4-tolylene-diisocyanate and 2,6-tolylene-diisocyanate with a polyol compound selected from polypropylene glycol and polytetramethylene glycol and has a terminal isocyanate group and a curing agent selected from 3,5-diethyl-toluenediamine and 3,5-dimethylthiotoluenediamine at 70 to 140° C. for 2 to 20 hours, and having a "JIS "A" hardness" level ranging from 92 to 100, wherein the urethane prepolymer and the curing agent are mixed such that the equivalent ratio (H/NCO) of an active hydrogen group (H) of the curing agent and an isocyanate group (NCO) of the urethane prepolymer has a value in the range of $0.93 < H/NCO < 1.05$.

The shoe press belt for papermaking shown in FIG. 1(c) is a belt for paper making comprising the reinforcing fiber base and the polyurethane layer which are integral with each other, the reinforcing fiber base being embedded in the polyurethane layer, the polyurethane layer comprising the outer circumferential polyurethane layer 2a, the intermediate polyurethane layer 2c and the inner polyurethane circumferential layer 2b, wherein the polyurethane of the outer polyurethane circumferential layer 2a is a polyurethane having a "JIS "A" hardness" level ranging from 92 to 100 and produced by heat-curing a mixed composition of the above urethane prepolymer (A) and the above curing agent (B) having the active hydrogen group (H), and wherein the urethane prepolymer (A) and the curing agent (B) are mixed such that the equivalent ratio (H/NCO) of the active hydrogen group (H) of the curing agent and the isocyanate group (NCO) of the urethane prepolymer has a value in the range of $0.88 \leq H/NCO \leq 1.12$. A polyurethane of the inner circumferential polyurethane layer 2b and the intermediate polyurethane layer 2c are a polyurethane having a "JIS "A" hardness" level ranging from 92 to 100 and produced by heat-curing a mixed composition of a terminal isocyanate group-containing urethane prepolymer, which is obtained by reacting 4,4'-methylene-bis(phenyl isocyanate) with polytetramethylene glycol, and a curing agent selected from 3,5-dimethylthiotoluenediamine and 1,4-butanediol at 70 to 140° C. for 2 to 20 hours, wherein the urethane prepolymer and the curing agent are mixed such that the equivalent ratio (H/NCO) of an active hydrogen group (H) of the curing agent and an isocyanate group (NCO) of the urethane prepolymer has a value in the range of $0.93 < H/NCO < 1.05$.

Figure 2:
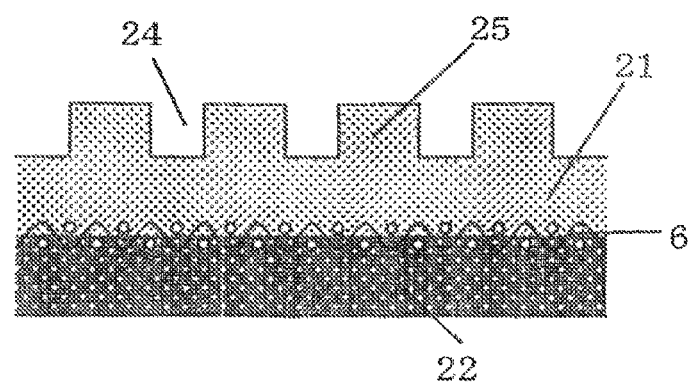
FIG. 2 is a cross-sectional view of a shoe press belt (known).
Figure 3:
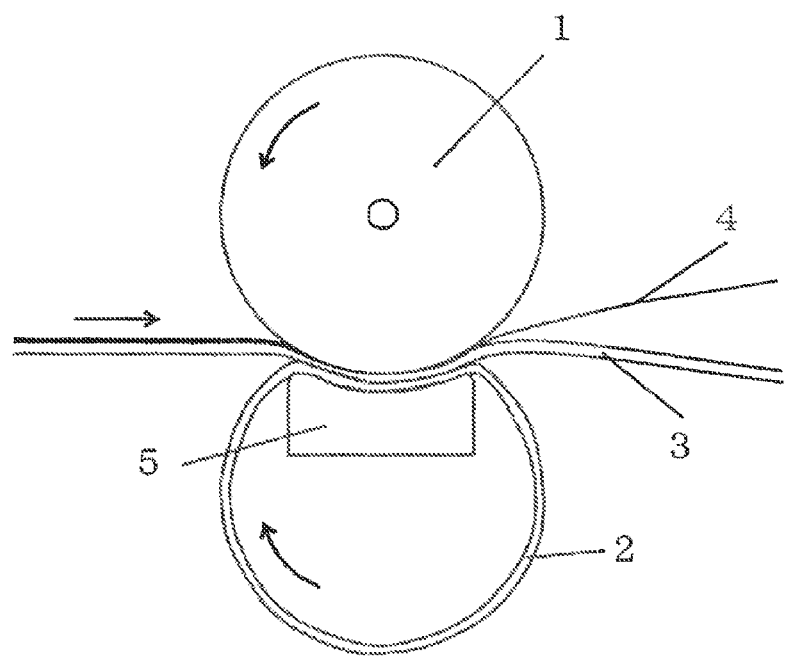
FIG. 3 is a cross-sectional view of a wet paper web dehydrator (known).

One example of a method for manufacturing the shoe press belt for papermaking is as follows. A mixture of a urethane prepolymer and a curing agent for producing the inner circumferential polyurethane layer is applied to the surface of the mandrel so as to form the inner circumferential polyurethane layer to a thickness in the range from 0.8 to 3.5 mm, while the mandrel, the surface of which a parting agent is applied to, being rotating, and then the applied layer of the mixture is precured by being heated at 70 to 140° C. for 0.5 to 1 hour. The reinforcing fiber base is placed on the inner circumferential polyurethane layer, then, a mixture of a urethane prepolymer and a curing agent for producing the intermediate layer is applied to a thickness ranging from 0.5 to 2 mm to impregnate the base and bonded to the inner circumferential polyurethane layer, and then the applied layer of the mixture is precured at 50 to 120° C. for 0.5 to 1 hour so as to form the intermediate polyurethane layer reinforced with the fiber base. Thereafter, while the mandrel is rotating, a mixture of a urethane prepolymer and a curing agent for producing the outer circumferential polyurethane layer is applied to the surface of the intermediate layer to form the outer circumferential polyurethane layer to a thickness in the range from 1.5 to 4 mm, then the applied layer of the mixture is cured by being heated at 70 to 140° C. for 2 to 20 hours. Thereafter, if necessary, the grooves shown in FIG. 2 are formed in the outer circumferential polyurethane layer. Specifically, to form the grooves in the outer circumferential polyurethane layer, a heated embossing roll having ridges complementary to the depth of the grooves on its surface may be pressed against the outer circumferential polyurethane layer being cured, while the polyurethane layer is being cured with heat. The mandrel incorporates a heating device therein.

Another example of method for manufacturing the shoe press belt for papermaking is as follows. A mixture of a urethane prepolymer and a curing agent for producing the inner circumferential polyurethane layer is applied to the mandrel, the surface of which a parting agent is applied to, so as to form a polyurethane layer to a thickness in the range from 0.8 to 3 mm, and then precured by being heated at 70 to 140° C. for 0.5 to 2 hours. The reinforcing fiber base is then placed on the outer surface of the cured polyurethane layer, then a mixture of a urethane prepolymer and a curing agent for producing the intermediate layer is applied to a thickness ranging from 0.5 to 2 mm to impregnate the fiber base and bonded to the inner circumferential layer, and then the applied layer of the mixture is precured at 50 to 120° C. for 0.5 to 1 hour, thereby producing the intermediate polyurethane layer reinforced with the fiber base. Next, a mixture of the urethane prepolymer (A) and the curing agent (B) for producing the outer circumferential layer is applied to form the outer circumferential polyurethane layer having a thickness in the range from 2 to 4 mm, and then post-cured at 70 to 140° C. for 4 to 16 hours. Then, grooves are formed in the surface of the outer circumferential polyurethane layer by a cutting tool, after which the surface of the outer circumferential polyurethane layer is polished by sandpaper or a polyurethane polishing cloth.

Another method of manufacturing the shoe press belt for papermaking employs two rolls instead of a mandrel. According to this method, an endless reinforcing fiber woven base is stretched between the two rolls, a mixture of a urethane prepolymer and a curing agent is applied to the surface of the reinforcing fiber base to impregnate the reinforcing fiber base, and then precured at 50 to 120° C. for 0.5 to 3 hours. Thereafter, a mixture of a urethane prepolymer and a curing agent for producing the inner circumferential polyurethane layer is applied to form the inner circumferential polyurethane layer to a thickness in the range from 0.5 to 3 mm, the mixture is cured at 70 to 140° C. for 2 to 12 hours, and its surface is polished by sandpaper or a polishing cloth to produce a partly finished product of integral structure including the inner circumferential polyurethane layer 2b and the reinforcing fiber base which are bonded to each other. Then, the partly finished product is reversed and stretched on and between the two rolls. The surface of the stretched partly finished product is coated with a mixture of a urethane prepolymer and a curing agent to impregnate the reinforcing fiber base with the mixture, then the surface is further coated with a mixture of the urethane prepolymer (A) and the curing agent (B) to a thickness ranging from 1.5 to 4 mm, and the mixture is cured at 70 to 140° C. for 2 to 20 hours. After the curing is finished, the surface layer is polished to a given thickness, and grooves are formed therein by a cutting tool to produce the outer circumferential layer.

EXAMPLES

Polyurethane test pieces for evaluating the properties of polyurethane of the shoe press belt were produced as follows.

Reference Example 1

A urethane prepolymer (the isocyanate group (NCO) was 5.51%, the viscosity at 55° C. was 1,800 cps, and the preheating temperature was 66° C.), which was obtained by reacting p-phenylene-diisocyanate (PPDI) with polytetramethylene glycol (PTMG), and a curing agent mixture of 97 molar % of 1,4-butanediol (1,4-BD) and 3 molar % of trimethylolpropane (TMP) were mixed (the equivalent ratio (H/NCO) was 0.95), then the mixture thus obtained was poured into a mold assembly preheated to 127° C., the mold assembly was heated to 127° C. to precure the mixture at 127° C. for 0.5 hour, an upper die was removed from the die assembly, and the mixture was post-cured at 127° C. for 16 hours, thereby producing a cured polyurethane sheet having a "JIS "A" hardness" level of 98.1. A test piece (having a thickness of 3.4 mm) was fabricated from the sheet.

Reference Example 2

A urethane prepolymer (the isocyanate group (NCO) was 8.85%, the viscosity at 100° C. was 400 cps, and the preheating temperature was 80° C.), which was obtained by reacting 4,4'-methylene-bis(phenyl isocyanate) (MDI) with polytetramethylene glycol (PTMG), and a curing agent mixture of 97 molar % of 1,4-butanediol (1,4-BD) and 3 molar % of trimethylolpropane (TMP) were mixed (The equivalent ratio (H/NCO) was 0.90), then the mixture thus obtained was poured into a mold assembly preheated to 115° C., the mold assembly was heated to 115° C. to precure the mixture at 115° C. for 1 hour, an upper die was removed from the die assembly, and the mixture was post-cured at 115° C. for 16 hours, thereby producing a cured polyurethane sheet having a "JIS "A" hardness" level of 92.2. A test piece (having a thickness of 3.4 mm) was fabricated from the sheet.

Reference Example 3

A urethane prepolymer (the isocyanate group (NCO) was 6.02%, the viscosity at 80° C. was 400 cps, and the preheating temperature was 66° C.), which was obtained by reacting a mixture (TDI) of 2,4-tolylene-diisocyanate and 2,6-tolylene-diisocyanate with polytetramethylene glycol (PTMG), and a curing agent mixture of 97 molar % of 3,5-dimethylthiotoluenediamine (ETHACURE300) and 3 molar % of glycerin were mixed (the equivalent ratio (H/NCO) was 0.95), then the mixture thus obtained was poured into a mold assembly preheated to 100° C., the mold assembly was heated to 100° C. to precure the mixture at 100° C. for 0.5 hour, an upper die was removed from the die assembly, and the mixture was post-cured at 100° C. for 16 hours, thereby producing a cured polyurethane sheet having a "JIS "A" hardness" level of 95.0. A test piece (having a thickness of 3.4 mm) was fabricated from the sheet.

Reference Example 4

A urethane prepolymer (the isocyanate group (NCO) was 5.51%, the viscosity at 55° C. was 1,800 cps, and the preheating temperature was 127° C.), which was obtained by reacting p-phenylene-diisocyanate (PPDI) with polytetramethylene glycol (PTMG), and a curing agent mixture of 97 molar % of hydroquinone-bis-β hydroxyl ethyl ether (HQEE) and 3 molar % of trimethylolpropane (TMP) were mixed (the equivalent ratio (H/NCO) was 0.95), then the mixture thus obtained was poured into a mold assembly preheated to 127° C., the mold assembly was heated to 127° C. to precure the mixture at 127° C. for 0.5 hour, an upper die was removed from the die assembly, and the mixture was post-cured at 127° C. for 16 hours, thereby producing a cured polyurethane sheet having a "JIS "A" hardness" level of 98.2. A test piece (having a thickness of 3.4 mm) was fabricated from the sheet.

Reference Example 5

A Urethane prepolymer (the isocyanate group (NCO) was 5.51%, the viscosity at 55° C. was 1,800 cps, and the preheating temperature was 66° C.), which was obtained by reacting p-phenylene-diisocyanate (PPDI) with polytetramethylene glycol (PTMG), and a curing agent mixture of 80 molar % of 1,4-butanediol (1,4-BD) and 20 molar % of glycerin were mixed (the equivalent ratio (H/NCO) was 0.98), then the mixture thus obtained was poured into a mold assembly preheated to 127° C., the mold assembly was heated to 127° C. to precure the mixture at 127° C. for 0.5 hour, an upper die was removed from the die assembly, and the mixture is post-cured at 127° C. for 16 hours, thereby producing a cured polyurethane sheet having a "JIS "A" hardness" level of 98.1. A test piece (having a thickness of 3.4 mm) was fabricated from the sheet.

Reference Example 6

A urethane prepolymer (the isocyanate group (NCO) was 3.51%, the viscosity at 100° C. was 2,500 cps, and the preheating temperature was 100° C.), which was obtained by reacting p-phenylene-diisocyanate (PPDI) with polycarbonatediol (PCD) and a curing agent mixture of 93 molar % of 1,4-butanediol (1,4-BD) and 7 molar % of trimethylolpropane (TMP) were mixed (the equivalent ratio (H/NCO) was 0.90), then the mixture thus obtained was poured into a mold assembly preheated to 127° C., the mold assembly was heated to 127° C. to precure the mixture at 127° C. for 0.5 hour, an upper die was removed from the die assembly, and the mixture was post-cured at 127° C. for 16 hours, thereby producing a cured polyurethane sheet having a "JIS "A" hardness" level of 94.9. A test piece (having a thickness of 3.4 mm) was fabricated from the sheet.

Reference Example 7

A urethane prepolymer (the isocyanate group (NCO) was 5.51%, the viscosity at 55° C. was 1,800 cps, and the preheating temperature was 66° C.), which was obtained by reacting p-phenylene-diisocyanate (PPDI) with polytetramethylene glycol (PTMG), and a curing agent mixture of 93 molar % of 1,2-ethylene glycol (1,2-EG) and 7 molar % of trimethylolpropane (TMP) were mixed (the equivalent ratio (H/NCO) was 0.93), then the mixture thus obtained was poured into a mold assembly preheated to 127° C., the mold assembly was heated to 127° C. to precure the mixture at 127° C. for 0.5 hour, an upper die was removed from the die assembly, and the mixture was post-cured at 127° C. for 16 hours, thereby producing a cured polyurethane sheet having a "JIS "A" hardness" level of 97.4. A test piece (having a thickness of 3.4 mm) was fabricated from the sheet.

Reference Example 8

A urethane prepolymer (the isocyanate group (NCO) was 5.51%, the viscosity at 55° C. was 1,800 cps, and the preheating temperature was 66° C.), which was obtained by reacting p-phenylene-diisocyanate (PPDI) with polytetramethylene glycol (PTMG), and a curing agent mixture of 64 molar % of 1,4-butanediol (1,4-BD), 30 molar % of polyether glycol (PEG) having a molecular weight of 1,000, and 6 molar % of glycerin were mixed (the equivalent ratio (H/NCO) was 0.90), then the mixture thus obtained was poured into a mold assembly preheated to 127° C., the mold assembly was heated to 127° C. to precure the mixture at 127° C. for 0.5 hour, an upper die was removed from the die assembly, and the mixture was post-cured at 127° C. for 16 hours, thereby producing a cured polyurethane sheet having a "JIS "A" hardness" level of 95.6. A test piece (having a thickness of 3.4 mm) was fabricated from the sheet.

Reference Example 9

A urethane prepolymer (the isocyanate group (NCO) was 5.51%, the viscosity at 55° C. was 1,800 cps, and the preheating temperature was 66° C.), which was obtained by reacting p-phenylene-diisocyanate (PPDI) with polytetramethylene glycol (PTMG), and a curing agent mixture of 94 molar % of 1,4-butanediol (1,4-BD), 3 molar % of 3,5-diethyltoluenediamine (ETHACURE100: trade name), and 3 molar % of trimethylolpropane (TMP) were mixed (the equivalent ratio (H/NCO) was 0.93), then the mixture thus obtained was poured into a mold assembly preheated to 127° C., the mold assembly was heated to 127° C. to precure the mixture at 127° C. for 0.5 hour, an upper die was removed from the die assembly, and the mixture was post-cured at 127° C. for 16 hours, thereby producing a cured polyurethane sheet having a "JIS "A" hardness" level of 98.1. A test piece (having a thickness of 3.4 mm) was fabricated from the sheet.

Reference Example 10

A urethane prepolymer (the isocyanate group (NCO) was 5.51%, the viscosity at 55° C. was 1,800 cps, and the preheating temperature was 66° C.), which was obtained by reacting p-phenylene-diisocyanate (PPDI) with polytetramethylene glycol (PTMG), and a curing agent mixture of 90 molar % of 1,4-butanediol (1,4-BD), 3 molar % of poly (tetramethylene oxide)-di-p-aminobenzoate (ELASMER1000P), and 7 molar % of trimethylolpropane (TMP) were mixed (the equivalent ratio (H/NCO) was 0.94), then the mixture thus obtained was poured into a mold assembly preheated to 127° C., the mold assembly was heated to 127° C. to precure the mixture at 127° C. for 0.5 hour, an upper die was removed from the die assembly, and the mixture was post-cured at 127° C. for 16 hours, thereby producing a cured polyurethane sheet having a "JIS "A" hardness" level of 98.0. A test piece (having a thickness of 3.4 mm) was fabricated from the sheet.

Reference Examples 11, 12

For Comparison

From the urethane prepolymer and the curing agents shown in Table 1, test pieces (having a thickness of 3.4 mm) were produced of polyurethane sheets in the same manner as with Reference example 1 under the molding conditions shown in Table 1. The compounded amount of each of the curing agents shown in Table 1 refers to parts by weight of the curing agent with respect to 100 parts by weight of the urethane prepolymer.

The obtained test pieces were evaluated for hardness, wear loss and crack development. These properties are shown in Table 1.

Figure 4:
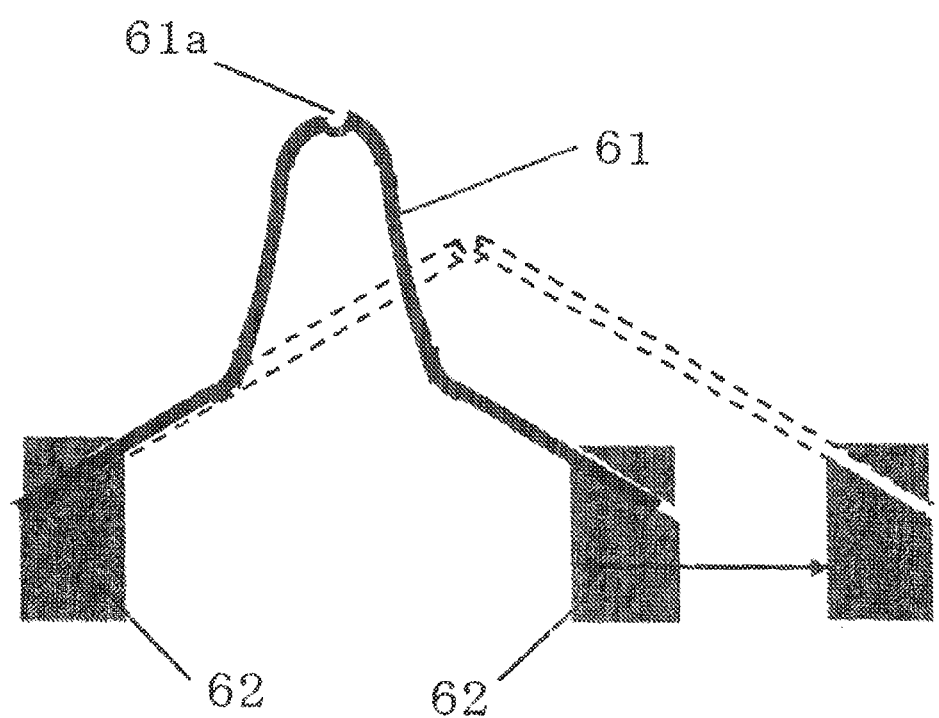
FIG. 4 is a view illustrative similar to a De Mattia flexing test (known).

In the wear test, the apparatus disclosed in FIG. 4 of JP, A, 2006-144139 was used. Each of the test pieces was attached to a lower portion of a press board, and a rotating roll having a friction member on its outer circumferential surface was rotated while being pressed against a lower surface (a surface to be measured) of the test piece. A pressure applied by the rotating roll was 9.6 kg/cm, a rotational speed of the rotating roll was 100 m/minute and the rotating roll was rotated for 20 minutes. After the rotation, a reduction in the thickness of the belt sample (i.e., wear loss) was measured.

In The flexural test, using a tester, shown in FIG. 4, similar to the De Mattia flexing test machine defined by JIS-K-6260 (2005), the test pieces were tested for crack development at a temperature of 20° C. and a relative humidity of 52% under the following conditions:

A test piece 61 had a size represented by a width of 25 mm and a length of 185 mm (including a gripping allowance (20 mm on each side)), a pair of grippers 62 were spaced apart from each other by a distance of 150 mm, the test piece 61 had a thickness of 3.4 mm and a semicircular dimple 61a defined centrally therein which had a radius of 1.5 mm. In the reciprocal movement, a motion distance of 65 mm, a maximum distance of 100 mm and a minimum distance of 35 mm of the space of the grippers, a reciprocating rate of 360 reciprocating strokes/minute were set. A notch was defined centrally in the test piece and had a length of about 2 mm in the transverse direction of the test piece. The test piece 61 was inclined at an angle of 45° to the direction in which the grippers 62 were relatively reciprocally moved. Under the above conditions, the test piece was repeatedly flexed and measured for the length of a crack each time a certain stroke count was reached. The stroke count refers to a value produced by multiplying the test time by the reciprocating rate. The test was finished at the time the crack length, starting from the initial measured notch length value (about 2 mm), exceeded 15 mm. Approximate curves were plotted based on the stroke counts and the crack lengths, and the stroke counts at the crack length of 15 mm were read from the approximate curves. Values produced by dividing the grown crack lengths (the crack length of 15 mm—the initial measured notch length value) by the corresponding stroke counts were used as indicating crack development.

TABLE 1

| Urethane prepolymer | | Reference Example 1 Inventive Example 1 | Reference Example 2 Inventive Example 2 | Reference Example 3 Inventive Example 3 | Reference Example 4 Inventive Example 4 | Reference Example 5 Inventive Example 5 | Reference Example 6 Inventive Example 6 | Reference Example 7 Inventive Example 7 |
|---|---|---|---|---|---|---|---|---|
| Isocyanate | | PPDI | MDI | TDI | PPDI | PPDI | PPDI | PPDI |
| Polyol | | PTMG | PTMG | PTMG | PTMG | PTMG | PCD | PTMG |
| NCO % | | 5.51 | 8.85 | 6.02 | 5.51 | 5.51 | 3.51 | 5.51 |
| Viscosity(cps) | | 1800 (@55° C.) | 400 (@100° C.) | 400 (@80° C.) | 1800 (@55° C.) | 1800 (@55° C.) | 2500 (@100° C.) | 1800 (@55° C.) |
| Preheating temperature(° C.) | | 66 | 80 | 66 | 127 | 66 | 100 | 66 |
| Curing agent (Compound name) | | 1,4-BD | 1,4-BD | ETHACURE 300 | HQEE | 1,4-BD | 1,4-BD | 1,2-EG |
| Equivalent ratio | | 45.06 | 45.06 | 107.15 | 99.11 | 45.06 | 45.06 | 31.03 |
| Active hydrogen(molar %) | | 97 | 97 | 97 | 97 | 80 | 93 | 93 |
| Preheating temperature(° C.) | | 24 | 24 | 24 | 127 | 24 | 24 | 24 |
| Curing agent (Compound name) | | TMP | TMP | Glycerin | TMP | Glycerin | TMP | TMP |
| Equivalent ratio | | 44.72 | 44.72 | 30.7 | 44.72 | 30.7 | 44.72 | 44.72 |
| Active hydrogen(molar %) | | 3 | 3 | 3 | 3 | 20 | 7 | 7 |
| Preheating temperature(° C.) | | 66 | 66 | 24 | 127 | 24 | 66 | 66 |
| Equivalent ratio of curing agents | | 45.05 | 45.05 | 104.86 | 97.48 | 42.19 | 45.04 | 31.99 |
| Composition(H/NCO ratio) | | 0.95 | 0.90 | 0.95 | 0.95 | 0.98 | 0.90 | 0.93 |
| Curing agent compounded amount (parts) | | 5.6 | 8.5 | 14.3 | 12.1 | 5.4 | 3.4 | 3.9 |
| Precuring conditions(° C./Hr) | | 127/0.5 | 115/1 | 100/0.5 | 127/0.5 | 127/0.5 | 127/0.5 | 127/0.5 |
| Postcuring conditions(° C./Hr) | | 127/16 | 115/16 | 100/16 | 127/16 | 127/16 | 127/16 | 127/16 |
| Properties | JIS A hardness | 98.1 | 92.2 | 95.0 | 98.2 | 98.1 | 94.9 | 97.4 |
| | Wear loss (mm) | 0.053 | 0.108 | 0.084 | 0.090 | 0.073 | 0.091 | 0.102 |
| | Crack development (μm/counts) | 1.06 | 0.34 | 5.71 | 1.94 | 5.53 | 5.31 | 1.61 |

| Urethane prepolymer | Reference Example 8 Inventive Example 8 | Reference Example 9 Inventive Example 9 | Reference Example 10 Inventive Example 10 | Reference Example 11 Inventive Example 11 | Reference Example 12 Comparative Example 1 | Reference Example 13 Comparative Example 2 |
|---|---|---|---|---|---|---|
| Isocyanate | PPDI | PPDI | PPDI | PPDI | TDI | MDI |
| Polyol | PTMG | PTMG | PTMG | PTMG | PTMG | PTMG |
| NCO % | 5.51 | 5.51 | 5.51 | 5.51 | 6.02 | 8.85 |
| Viscosity(cps) | 1800 (@55° C.) | 1800 (@55° C.) | 1800 (@55° C.) | 1800 (@55° C.) | 400 (@80° C.) | 400 (@100° C.) |
| Preheating temperature(° C.) | 66 | 66 | 66 | 66 | 66 | 80 |
| Curing agent (Compound name) | 1,4-BD | 1,4-BD | 1,4-BD | 1,4-BD | ETHACURE 300 | 1,4-BD |
| Equivalent ratio | 45.06 | 45.06 | 45.06 | 45.06 | 107.15 | 45.06 |
| Active hydrogen(molar %) | 64 | 94 | 90 | 96.9 | 100 | 100 |
| Preheating temperature(° C.) | 24 | 24 | 24 | 24 | 24 | 24 |
| Curing agent (Compound name) | PEG | ETHACURE 100 | ELASMER 1000P | PDA | | |
| Equivalent ratio | 488 | 89.14 | 607.25 | 51.57 | | |
| Active hydrogen(molar %) | 30 | 3 | 3 | 0.1 | | |
| Preheating temperature(° C.) | 24 | 24 | 24 | 24 | | |
| Curing agent (Compound name) | Glycerin | TMP | TMP | Glycerin | | |

TABLE 1-continued

| | | | | | | | |
|---|---|---|---|---|---|---|---|
| Equivalent ratio | | 30.7 | 44.72 | 44.72 | 30.7 | | |
| Active hydrogen(molar %) | | 6 | 3 | 7 | 3 | | |
| Preheating temperature(° C.) | | 24 | 66 | 66 | 24 | | |
| Equivalent ratio of curing agents | | 177.08 | 46.37 | 61.90 | 44.64 | 107.15 | 45.06 |
| Composition(H/NCO ratio) | | 0.90 | 0.93 | 0.94 | 0.95 | 0.95 | 0.95 |
| Curing agent compounded amount (parts) | | 20.9 | 5.8 | 7.6 | 5.6 | 14.6 | 9.0 |
| Precuring conditions(° C./Hr) | | 127/0.5 | 127/0.5 | 127/0.5 | 127/0.5 | 100/0.5 | 115/1 |
| Postcuring conditions(° C./Hr) | | 127/16 | 127/16 | 127/16 | 127/16 | 100/16 | 115/16 |
| Proper- | JIS A hardness | 95.6 | 98.1 | 98.0 | 98.1 | 95.1 | 95.2 |
| ties | Wear loss (mm) | 0.111 | 0.109 | 0.079 | 0.094 | 0.140 | 0.988 |
| | Crack development (μm/counts) | 1.79 | 1.89 | 2.01 | 0.72 | 6.09 | 0.08 |

It can be seen from Table 1 that the test pieces according to Reference examples 1 through 11 have much better crack development resistance and wear resistance than the test piece according to the background art (Comparative example 1) disclosed in the earlier documents. Further, the test pieces according to Reference examples 1 through 11 are polyurethane which have excellent mechanical properties in wear resistance and crack development resistance, compared with that of the background art (Comparative example 2).

Examples in which shoe press belts for papermaking with the reinforcing fiber base embedded in the polyurethane are manufactured using the polyurethanes according to Reference examples 1 through 11 will be described below.

Inventive Example 1

Step 1: A parting agent (KS-61: manufactured by Shin-Etsu Chemical Co., Ltd.) was coated on the polished surface of a mandrel which had a diameter of 1,500 mm and which could be rotated about its own axis by a suitable drive means. Then, a polyurethane resin mixture of the urethane prepolymer (PPDI/PTMG prepolymer) and a curing agent mixture of 97 molar % of 1,4-butanediol (manufactured by Mitsubishi Chemical Co., Ltd.) and 3 molar % of trimethylolpropane (TMP), which was mixed such that the equivalent ratio (H/NCO) was 0.95 according to Reference example 1, was spirally coated on the rotating mandrel to a thickness of 1.4 mm by a pouring formation nozzle, which is movable parallel to the rotational axis of the mandrel, (this coating process will hereinafter referred to as "spiral coating") to form a polyurethane resin layer. The mandrel was left to stand at the room temperature (30° C.) for 40 minutes while the mandrel being rotated, then the polyurethane resin mixture is precured by being heated at 127° C. for 30 minutes by a heater attached to the mandrel to produce a shoe-side inner circumferential polyurethane layer.

Step 2: A grid-like web wherein, multifilament twisted yarns of 5,000 [dtex] made of polyethylene terephthalate fiber were used as CMD yarns, multifilament yarns of 550 [dtex] made of polyethylene terephthalate fiber were used as MD yarns, the MD yarns are sandwiched by the CMD yarns, and the crossings of the MD yarns and the CMD yarns were joined by a urethane adhesive, were prepared (the MD yarn density was 1 yarn/cm., and the CMD yarn density were 4 yarns/cm.). A plurality of grid-like webs were placed as one layer, without gaps therebetween, on the outer circumferential surface of the shoe-side layer such that the CMD yarns extend along the axial direction of the mandrel. Then, multifilament yarns of 6,700 [dtex] of polyethylene terephthalate fiber were helically wound around the outer circumferential surfaces of the grid-like webs at a pitch of 30 yarns/5 cm, producing a wound-yarn layer. Thereafter, the polyurethane resin mixture was applied as an intermediate layer to a thickness of about 1.6 mm sufficiently to close the gap between the grid-like webs and the wound-yarn layer, thereby integrally joining the grid-like webs and the wound-yarn layer to produce an intermediate polyurethane layer having a reinforcing fiber base.

Step 3: The same polyurethane resin mixture as the polyurethane resin mixture used to make the shoe-side layer was coated on the intermediate layer to a thickness of about 2.5 mm by spiral coating, then the assembly was left to stand at the room temperature for 40 minutes, and thereafter postcured by being heated at 127° C. for 16 hours, producing a wet paper web-side layer (an outer circumferential polyurethane layer). Then, the surface of the wet paper web-side layer was polished until the overall thickness becomes 5.2 mm. Thereafter, a number of concave grooves (a groove width of 0.8 mm, a depth of 0.8 mm, and a pitch of 2.54 mm) were formed in the MD (machine direction) of the belt, using a rotating blade to produce a shoe press belt.

Inventive Example 2

A shoe press belt was produced in the same manner as Inventive example 1, except that the polyurethane resin mixture according to Reference example 2 (the polyurethane resin composition wherein the MDI/PTMG prepolymer and the mixed curing agent of 1,4-butanediol and TMP were mixed with each other, with the equivalent ratio (H/NCO) being 0.90) was used instead of the polyurethane resin mixture according to Reference example 1, and that the curing conditions for the polyurethane resin mixture were changed to 115° C. and 60 minutes for precuring and to 115° C. and 16 hours for post-curing.

Inventive Example 3

A shoe press belt was produced in the same manner as Inventive example 1, except that the polyurethane resin mixture according to Reference example 3 (the polyurethane resin composition wherein the TDI/PTMG prepolymer and the mixed curing agent made up of ETHACURE300 and glycerin were mixed with each other, with the equivalent ratio (H/NCO) being 0.95) is used instead of the polyurethane resin mixture according to Reference example 1, and that the curing conditions for the polyurethane resin mixture were changed to 100° C. and 30 minutes for precuring and to 100° C. and 16 hours for post-curing.

Inventive Example 4

A shoe press belt was produced in the same manner as Inventive example 1, except that the polyurethane resin mixture according to Reference example 4 (the polyurethane resin composition wherein the PPDI/PTMG prepolymer and the mixed curing agent made up of HQEE and TMP were mixed with each other, with the equivalent ratio (H/NCO) being 0.95) was used instead of the polyurethane resin mixture according to Reference example 1.

Inventive Example 5

A shoe press belt was produced in the same manner as Inventive example 1, except that the polyurethane resin mixture according to Reference example 5 (the polyurethane resin composition wherein the PPDI/PTMG prepolymer and the mixed curing agent made up of 1,4-butanediol and glycerin were mixed with each other, with the equivalent ratio (H/NCO) being 0.98) was used instead of the polyurethane resin mixture according to Reference example 1.

Inventive Example 6

A shoe press belt was produced in the same manner as Inventive example 1, except that the polyurethane resin mixture according to Reference example 6 (the polyurethane resin composition wherein the PPDI/PCD prepolymer and the mixed curing agent made up of 1,4-butanediol and TMP were mixed with each other, with the equivalent ratio (H/NCO) being 0.90) was used instead of the polyurethane resin mixture according to Reference example 1.

Inventive Example 7

A shoe press belt was produced in the same manner as Inventive example 1, except that the polyurethane resin mixture according to Reference example 7 (the polyurethane resin composition wherein the PPDI/PTMG prepolymer and the mixed curing agent made up of 1,2-ethylene glycol and TMP were mixed with each other, with the equivalent ratio (H/NCO) being 0.93) was used instead of the polyurethane resin mixture according to Reference example 1.

Inventive Example 8

A shoe press belt was produced in the same manner as Inventive example 1, except that the polyurethane resin mixture according to Reference example 8 (the polyurethane resin composition wherein the PPDI/PTMG prepolymer and the mixed curing agent made up of 1,4-butanediol, PEG and glycerin are mixed with each other, with the equivalent ratio (H/NCO) being 0.90) is used instead of the polyurethane resin mixture according to Reference example 1.

Inventive Example 9

A shoe press belt was produced in the same manner as Inventive example 1, except that the polyurethane resin mixture according to Reference example 9 (the polyurethane resin composition wherein the PPDI/PTMG prepolymer and the mixed curing agent made up of 1,4-butanediol, ETHACURE100 and TMP were mixed with each other, with the equivalent ratio (H/NCO) being 0.93) was used instead of the polyurethane resin mixture according to Reference example 1.

Inventive Example 10

A shoe press belt was produced in the same manner as Inventive example 1, except that the polyurethane resin mixture according to Reference example 10 (the polyurethane resin composition wherein the PPDI/PTMG prepolymer and the mixed curing agent made up of 1,4-butanediol, ELASMER1000P and TMP were mixed with each other, with the equivalent ratio (H/NCO) being 0.94) was used instead of the polyurethane resin mixture according to Reference example 1.

Inventive Example 11

A shoe press belt was produced in the same manner as Inventive example 1, except that the polyurethane resin mixture according to Reference example 11 (the polyurethane resin composition wherein the PPDI/PTMG prepolymer and the mixed curing agent made up of 1,4-butanediol, phenylenediamine (PDA) and glycerin were mixed with each other, with the equivalent ratio (H/NCO) being 0.95) was used instead of the polyurethane resin mixture according to Reference example 1.

Comparative Example 1

A shoe press belt was produced in the same manner as Inventive example 1, except that the polyurethane resin mixture according to Reference example 11 (the polyurethane resin composition wherein the TDI/PTMG prepolymer and ETHACURE300 were mixed with each other, with the equivalent ratio (H/NCO) being 0.95) was used instead of the polyurethane resin mixture according to Reference example 1, and that the curing conditions for the polyurethane mixture were changed to 100° C. and 30 minutes for precuring and to 100° C. and 16 hours for post-curing.

Comparative Example 2

A shoe press belt was produced in the same manner as Inventive example 1, except that the polyurethane resin mixture according to Reference example 12 (the polyurethane resin composition wherein the MDI/PTMG prepolymer and 1,4-butanediol were mixed with each other, with the equivalent ratio (H/NCO) being 0.95) was used instead of the polyurethane resin mixture according to Reference example 1, and that the curing conditions for the polyurethane resin mixture were changed to 115° C. and 1 hour for precuring and to 115° C. and 16 hours for post-curing.

A wear test and a flexural fatigue test were conducted on the shoe press belts thus produced. In the wear test, grooved product belt samples were evaluated. Since the grooves product belt samples tend to have a greater wear loss than planar resin test samples, they were tested under the following test conditions:

In the wear test, the apparatus disclosed in FIG. 4 of JP, A, 2006-144139 was used, each of the belt samples was attached to a lower portion of a press board, and a rotating roll having a friction member on its outer circumferential surface was rotated while being pressed against a lower surface (a surface to be measured) of the belt sample. A pressure applied by the rotating roll was 6.6 kg/cm, a rotational speed of the rotating roll was 100 m/minute, and the rotating roll was rotated for 45 seconds. After the belt sample was rotated, a reduction in the thickness of the belt sample (i.e., wear loss) was measured. The measurement results are shown in Table 2. The wear loss (the average value of the wear losses measured in five repeated cycles) was 0.093 mm for Inventive example 1, 0.199 mm for Inventive example 2, 0.164 mm for Inventive example 3, 0.169 mm for Inventive example 4, 0.145 mm for Inventive example 5, 0.191 mm for Inventive example 6, 0.199 mm for Inventive example 7, 0.216 mm for Inventive example 8, 0.201 mm for Inventive example 9, 0.163 mm for Inventive example 10, 0.186 mm for Inventive example 11, 0.269 mm for Comparative example 1 and 2.230 mm for Comparative example 2.

Figure 5:
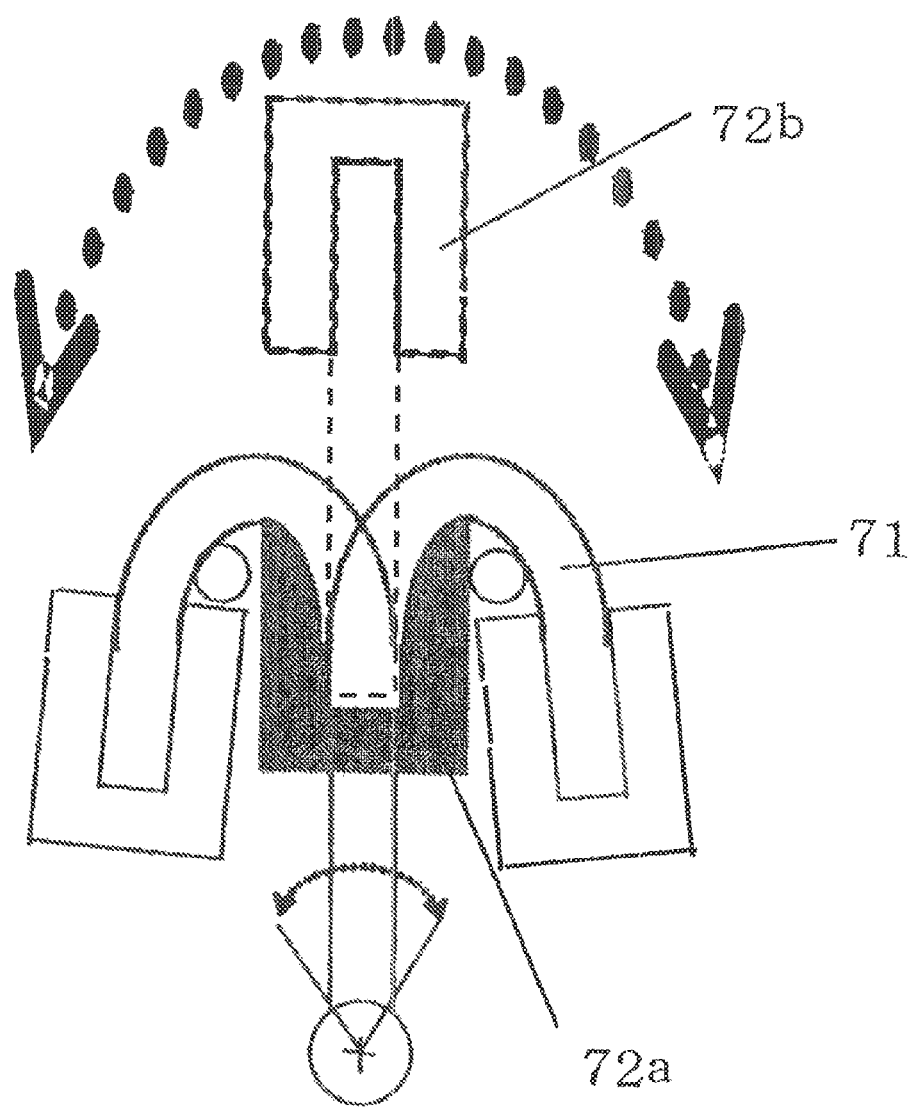
FIG. 5 is a view illustrative of a flexural fatigue test (known).

The flexural fatigue test was conducted on grooved belt samples. In the flexural fatigue test, an apparatus shown in FIG. 5 was used to produce cracks at a temperature of 20° C. and a relative humidity of 52% under the following conditions:

A test piece 71 had a width of 60 mm, and a pair of grippers was spaced apart from each other by a distance of 70 mm. By moving lower gripper 72a reciprocally along an arcuate path, the upper gripper 72b and the test piece were also reciprocally moved along an arcuate path, causing the distal end of the lower gripper to flex and fatigue the test piece. The distance from the center of the arcuate path to the distal end of the lower gripper was 168 mm, the distance that the lower gripper moves was 161 mm, and the reciprocating rate of the lower gripper was 162 reciprocating strokes/minute. The upper gripper had a weight of 400 g. The test piece was repeatedly flexed under the above conditions, and the number of times that the test piece was flexed until it cracked was measured. These measurement results are shown in Table 2. As shown in Table 2, the measured numbers of times that the test pieces were flexed indicate that the test piece according to Inventive example 1 did not crack when they were flexed 700,000 times, the test piece according to Inventive example 2 did not crack when they were flexed 700,000 times, the test piece according to Inventive example 3 was disabled when it was flexed 250,000 times, the test piece according to Inventive example 4 was disabled when it was flexed 650,000 times, the test piece according to Inventive example 5 was disabled when it was flexed 250,000 times, the test piece according to Inventive example 6 was disabled when it was flexed 250,000 times, the test piece according to Inventive example 7 did not crack when they were flexed 700,000 times, the test piece according to Inventive example 8 was disabled when it was flexed 700,000 times, the test piece according to Inventive example 9 did not crack when they were flexed 700,000 times, the test piece according to Inventive example 10 was disabled when it was flexed 600,000 times, the test piece according to Inventive example 11 did not crack when they were flexed 700,000 times, the test piece according to Comparative example 1 was disabled when it was flexed 200,000 times, and the test piece according to Comparative example 2 did not crack when they were flexed 700,000 times.

TABLE 2

|  | Inventive Example 1 | Inventive Example 2 | Inventive Example 3 | Inventive Example 4 | Inventive Example 5 | Inventive Example 6 | Inventive Example 7 |
| --- | --- | --- | --- | --- | --- | --- | --- |
| Wear loss (mm) | 0.093 | 0.199 | 0.164 | 0.169 | 0.145 | 0.191 | 0.199 |
| Flexed times (×10,000 times) | 70 (Not cracked) | 70 (Not cracked) | 25 | 65 | 25 | 25 | 70 (Not cracked) |

|  | Inventive Example 8 | Inventive Example 9 | Inventive Example 10 | Inventive Example 11 | Comparative Example 1 | Comparative Example 2 |
| --- | --- | --- | --- | --- | --- | --- |
| Wear loss (mm) | 0.216 | 0.201 | 0.163 | 0.186 | 0.269 | 2.230 |
| Flexed times (×10,000 times) | 70 | 70 (Not cracked) | 60 | 70 (Not cracked) | 20 | 70 (Not cracked) |

It will be understood from Table 2 that the shoe press belts according to Inventive examples 1 through 11 have an excellent flexural fatigue resistance capability and an excellent wear resistance capability, have a wear resistance capability which is 1.2 through 3 times the shoe press belts (according to Comparative examples 1, 2) according to the background art and the shoe press belts disclosed in the Patent document 1 and the Patent document 2, and hence have excellent durability.

Inventive Example 12

Step 1: A parting agent (KS-61: manufactured by Shin-Etsu Chemical Co., Ltd.) was coated on the polished surface of a mandrel which has a diameter of 1,500 mm and which can be rotated about its own axis by a suitable drive means. Then, a polyurethane resin mixture of the urethane prepolymer (PPDI/PTMG prepolymer) and a curing agent mixture of 97 molar % of 1,4-butanediol (manufactured by Mitsubishi Chemical Co., Ltd.) and 3 molar % of trimethylolpropane (TMP), which was mixed such that the equivalent ratio (H/NCO) was 0.95, according to Reference example 1 was spirally coated on the rotating mandrel to a thickness of 1.4 mm by a pouring formation nozzle that is movable parallel to the rotational axis of the mandrel (spiral coating) to form a polyurethane resin layer. The mandrel was left to stand at the room temperature (30° C.) for 40 minutes while the mandrel being rotated, the polyurethane resin mixture is precured by being heated at 127° C. for 30 minutes by a heater attached the mandrel to produce a shoe-side inner circumferential polyurethane layer.

Step 2: A grid-like web wherein multifilament twisted yarns of 5,000 [dtex] made of polyethylene terephthalate fiber were used as CMD yarns, multifilament yarns of 550 [dtex] made of polyethylene terephthalate fiber were used as MD yarns, the MD yarns were sandwiched by the CMD yarns and the crossings of the MD yarns and the CMD yarns were joined by a urethane adhesive was prepared (the MD yarn density is 1 yarn/cm., and the CMD yarn density is 4 yarns/cm.). A plurality of grid-like webs were placed as one layer, without gaps therebetween, on the outer circumferential surface of the shoe-side layer such that the CMD yarns extend along the axial direction of the mandrel. Then, multifilament yarns of 6,700 [dtex] of polyethylene terephthalate fiber were helically wound around the outer circumferential surfaces of the grid-like webs at a pitch of 30 yarns/5 cm, producing a wound-yarn layer. Thereafter, the polyurethane resin mixture (the mixture of the TDI/PTMG prepolymer and ETHA-CURE300) according to Reference example 7 was applied as an intermediate layer to a thickness of about 1.6 mm sufficiently to close the gap between the grid-like webs and the wound-yarn layer, thereby integrally joining the grid-like webs and the wound-yarn layer to produce a reinforcing fiber base.

Step 3: The same polyurethane resin mixture as the polyurethane resin mixture used to make the shoe-side layer was coated to the wound-yarn layer to a thickness of about 2.5 mm by spiral coating, then the assembly was left to stand at the room temperature for 40 minutes, and thereafter post-cured by being heated at 127° C. for 16 hours, producing a wet paper web-side layer (an outer circumferential polyurethane layer). Then, the surface of the wet paper web-side layer was polished until the overall thickness becomes 5.2 mm. Thereafter, a number of concave grooves (a groove width of 0.8 mm, a depth of 0.8 mm, and a pitch of 2.54 mm) were formed in the MD direction of the belt to produce a shoe press belt.

Inventive Example 13

A shoe press belt was produced in the same manner as Inventive example 1, except that the polyurethane resin mixture according to Reference example 1 was used for the outer circumferential layer and the intermediate layer (the impregnated fiber base layer) of the belt, that the urethane resin mixture (the mixture of the TDI/PTMG prepolymer and ETHACURE300) according to Reference example 7 was used for the inner circumferential layer, and that the curing conditions for the polyurethane resin mixture were changed to 100° C. and 30 minutes for precuring and to 100° C. and 16 hours for post-curing.

Inventive Example 14

Step 1: A parting agent (KS-61: manufactured by Shin-Etsu Chemical Co., Ltd.) was coated on the polished surface of a mandrel which had a diameter of 1,500 mm and which could be rotated about its own axis by a suitable drive means. The surface of the mandrel is coated with the polyurethane resin mixture (a mixture of the TDI/PTMG prepolymer and ETHACURE300) according to Reference example 7 to a thickness of 1.4 mm by spiral coating while the mandrel being rotated. The mandrel was left to stand at the room temperature for 40 minutes while the mandrel being rotated, then the resin was precured by being heated at 100° C. for 30 minutes by a heater attached to the mandrel.

Step 2: A fabric web (a CMD mesh of 30 CMD yarns/5 cm and a MD mesh of 40 MD yarns/5 cm), which was woven in a single-layer structure wherein monofilament yarns of 800 [dtex] made of polyethylene terephthalate fiber served as MD yarns and multifilament yarns of 4,500 [dtex] made of polyethylene terephthalate fiber served as CMD yarns, were prepared. A plurality of fabric webs were placed as one layer, without gaps therebetween, on the outer circumferential surface of the shoe-side layer such that the CMD yarns extend along the axial direction of the mandrel. Then, multifilament yarns of 7,000 [dtex] made of polyethylene terephthalate fiber were helically wound around the outer circumferential surfaces of the fabric webs at a pitch of 30 yarns/5 cm, producing a wound-yarn layer. Thereafter, the polyurethane resin mixture (the mixture of the TDI/PTMG prepolymer and ETHA-CURE300) according to Reference example 7 was applied as the intermediate layer by a doctor bar to a thickness of 1.6 mm sufficiently to close the gap between the woven webs and the wound-yarn layer, thereby integrally joining the woven webs and the wound-yarn layer to produce a reinforcing fiber base.

Step 3: The polyurethane resin mixture of a urethane prepolymer (PPDI/PTMG prepolymer) and a curing agent mixture of 97 molar % of 1,4-butanediol (manufactured by Mitsubishi Chemical Co., Ltd.) and 3 molar % of trimethylolpropane (TMP), which was mixed such that the equivalent ratio (H/NCO) was 0.95, according to Reference example 1 was applied to the wound-yarn layer to a thickness of about 2.5 mm by spiral coating, then, the assembly is post-cured by being heated at 127° C. for 16 hours. Then, the surface of the wet paper web-side layer was polished until the overall thickness becomes 5.2 mm, thereafter a number of concave grooves (a groove width of 0.8 mm, a depth of 0.8 mm, and a pitch of 2.54 mm) were formed in the MD direction of the belt, using a rotating blade to produce a shoe press belt.

INDUSTRIAL APPLICABILITY

The shoe press belt for papermaking according to the present invention exhibits more excellent mechanical properties in wear resistance, crack resistance and flexural fatigue resistance than those of shoe press belts for papermaking according to the background art, thus the durability of the shoe press belt according to the present invention is expected to be at least 1.5 times greater than the durability of shoe press belts for papermaking according to the background art.

The invention claimed is:

1. A shoe press belt for papermaking comprising a reinforcing fiber base and a polyurethane layer which are integral with each other, said reinforcing fiber base being embedded in said polyurethane layer, wherein said polyurethane layer comprises a polyurethane layer produced by curing a mixed composition of a urethane prepolymer (A) and a curing agent (B) having an active hydrogen group (H), said urethane prepolymer (A) obtained by reacting a polyisocyanate compound (a) comprising 55 to 100 molar % of a polyisocyanate compound selected from the group consisting of p-phenylene-diisocyanate, 4,4'-methylene-bis(phenyl isocyanate), and tolylene-diisocyanate, with a polyol compound (b) selected from the group consisting of polypropylene glycol, polytetramethylene glycol, and polycarbonate diol, and having a terminal isocyanate group, and said curing agent (B) comprising:

75 to 99.9 molar % of a curing agent (B1) selected from an aliphatic diol compound ($B1_1$) having the active hydrogen group (H) and a molecular weight in a range from 62 to 1,000, hydroquinone-bis-β hydroxylethyl ether and an organic polyamine compound ($B1_2$) having the active hydrogen group (H) and a molecular weight in a range from 108 to 1,300; and 25 to 0.1 molar % of an aliphatic triol compound (B2) having the active hydrogen group (H) and a molecular weight in a range from 92 to 134.

2. A shoe press belt for papermaking comprising a reinforcing fiber base and a polyurethane layer which are integral with each other, said reinforcing fiber base being embedded in said polyurethane layer, wherein said polyurethane layer comprises a polyurethane layer produced by curing a mixed composition of a urethane prepolymer (A) and a curing agent (B) having an active hydrogen group (H), said urethane prepolymer (A) obtained by reacting a polyisocyanate compound (a) comprising 55 to 100 molar % of a polyisocyanate compound selected from the group consisting of p-phenylene-diisocyanate, 4,4'-methylene-bis(phenyl isocyanate), and tolylene-diisocyanate, with a polyol compound (b) selected from the group consisting of polypropylene glycol, polytetramethylene glycol, and polycarbonate diol, and having a terminal isocyanate group, and said curing agent (B) comprising:
60 to 99.8 molar % of a curing agent ($B1_1$) selected from an aliphatic diol compound having the active hydrogen group (H) and a molecular weight in a range from 62 to 1,000 and hydroquinone-bis-β hydroxylethyl ether;

0.1 to 15 molar % of a curing agent ($B1_2$) selected from an organic polyamine compound having the active hydrogen group (H) and a molecular weight in a range from 108 to 1,300; and 25 to 0.1 molar % of an aliphatic triol compound (B2) having the active hydrogen group (H) and a molecular weight in a range from 92 to 134.

3. A shoe press belt for papermaking according to claim 1, wherein said aliphatic diol compound ($B1_1$), included in said curing agent (B) and having the active hydrogen group (H), is an aliphatic diol compound selected from the group consisting of ethylene glycol, 1,3-propanediol, 1,4-butanediol, 1,5-pentanediol, 1,6-hexanediol, polyethylene glycol, polypropylene glycol, and polybutylene glycol, and said aliphatic triol compound (B2) having the active hydrogen group (H) is an aliphatic triol compound selected from the group consisting of trimethylolpropane, propanetriol (glycerin), butanetriol, pentanetriol, hexanetriol, cyclopentanetriol, and cyclohexanetriol.

4. A shoe press belt for papermaking according to claim 1, wherein said organic polyamine compound ($B1_2$), included in said curing agent (B) and having the active hydrogen group (H), comprises a bifunctional organic diamine compound selected from the group consisting of 3,5-diethyltoluene-2,4-diamine, 3,5-diethyltoluene-2,6-diamine, 3,5-dimethylthiotoluene-2,4-diamine, 3,5-dimethylthiotoluene-2,6-diamine, 4,4'-bis(2-chloroaniline), 4,4'-bis(sec-butylamino)-diphenylmethane, N,N'-dialkyldiaminodiphenylmethane, 4,4'-methylenedianiline, 4,4'-methylene-bis(2,3-dichloroaniline), 4,4'-methylene-bis(2-chloroaniline), 4,4'-methylene-bis(2-ethyl-6-methylaniline), trimethylene-bis(4-aminobenzoate), poly(tetramethylene oxide)-di-p-aminobenzoate, phenylenediamine, polyetherdiamine, isophorone diamine, 4,4'-methylene-bis(2-methylcyclohexane-1-amine), 4,4'-methylene-bis(cyclohexaneamine), bis(aminomethyl)cyclohexane, and xylenediamine.

5. A shoe press belt for papermaking according to claim 1, wherein said organic polyamine compound ($B1_2$), included in said curing agent (B) and having the active hydrogen group (H), comprises an at least tri-functional organic polyamine compound selected from the group consisting of iminobispropylamine, bis(hexamethylene) triamine, triethylenetetramine, tetraethylenepentamine, pentaethylenehexamine, dipropylenetriamine, aminoethylethanolamine, tri(methylamino)hexane, and melamine.

6. A shoe press belt for papermaking according to claim 1, comprising a reinforcing fiber base and a polyurethane layer which are integral with each other, said reinforcing fiber base being embedded in said polyurethane layer, said polyurethane layer comprising an outer circumferential polyurethane layer and an inner circumferential polyurethane layer;

wherein said outer circumferential polyurethane layer is made of said polyurethane layer obtained by curing a mixed composition of said urethane prepolymer (A) and said curing agent (B); and said inner circumferential polyurethane layer is made of a polyurethane layer produced by curing a composition comprising:

a terminal isocyanate group-containing urethane prepolymer obtained by reacting 4,4'-methylene-bis(phenyl isocyanate) with a polyol compound selected from the group consisting of polypropylene glycol, polytetramethylene glycol, and polycarbonate diol; and a curing agent selected from the group consisting of 3,5-diethyltoluenediamine, 3,5-dimethylthiotoluenediamine, and 1,4-butanediol, or a polyurethane layer produced by curing a composition comprising:

a terminal isocyanate group-containing urethane prepolymer obtained by reacting a polyisocyanate compound selected from the group consisting of 2,4-tolylene-diisocyanate and 2,6-tolylene-diisocyanate with a polyol compound selected from the group consisting of polypropylene glycol and polytetramethylene glycol; and an organic diamine compound selected from the group consisting of 3,5-diethyltoluenediamine and 3,5-dimethylthiotoluenediamine.

7. A shoe press belt for papermaking according to claim 1, comprising a reinforcing fiber base and a polyurethane layer which are integral with each other, said reinforcing fiber base being embedded in said polyurethane layer, said polyurethane layer comprising an outer circumferential polyurethane layer, an intermediate polyurethane layer, and an inner circumferential polyurethane layer, and said outer circumferential polyurethane layer and said inner circumferential polyurethane layer being disposed on respective sides of said intermediate polyurethane layer, wherein:

said outer circumferential polyurethane layer is made of said polyurethane layer obtained by curing a mixed composition of said urethane prepolymer (A) and said curing agent (B);

said reinforcing fiber base is embedded in said intermediate polyurethane layer; and said intermediate polyurethane layer and said inner circumferential polyurethane layer are made of a polyurethane layer produced by curing a composition comprising a terminal isocyanate group-containing urethane prepolymer obtained by reacting 4,4'-methylene-bis(phenyl isocyanate) with a polyol compound selected from the group consisting of polypropylene glycol, polytetramethylene glycol, and polycarbonate diol, and a curing agent selected from the group consisting of 3,5-diethyltoluenediamine, 3,5-dimethylthiotoluenediamine, and 1,4-butanediol; or a polyurethane layer produced by curing a composition comprising a terminal isocyanate group-containing urethane prepolymer obtained by reacting a polyisocyanate compound selected from the group consisting of 2,4-tolylene-diisocyanate and 2,6-tolylene-diisocyanate, with a polyol compound selected from polypropylene glycol and polytetramethylene glycol, and an organic diamine compound selected from the group consisting of 3,5-diethyltoluenediamine and 3,5-dimethylthiotoluenediamine.

8. A shoe press belt for papermaking according to claim 1, comprising a reinforcing fiber base and a polyurethane layer which are integral with each other, said reinforcing fiber base being embedded in said polyurethane layer, and said polyurethane layer comprising an outer circumferential polyurethane layer and an inner circumferential polyurethane layer, wherein:
said inner circumferential polyurethane layer is made of said polyurethane layer obtained by curing a mixed composition of said urethane prepolymer (A) and said curing agent (B); and
said outer circumferential polyurethane layer is made of
a polyurethane layer produced by curing a composition comprising
a terminal isocyanate group-containing urethane prepolymer obtained by reacting 4,4'-methylene-bis(phenyl isocyanate) with a polyol compound selected from the group consisting of polypropylene glycol, polytetramethylene glycol, and polycarbonate diol, and
a curing agent selected from the group consisting of 3,5-diethyltoluenediamine, 3,5-dimethylthiotoluenediamine, and 1,4-butanediol; or
a polyurethane layer produced by curing a composition comprising
a terminal isocyanate group-containing urethane prepolymer obtained by reacting a polyisocyanate compound selected from the group consisting of 2,4-tolylene-diisocyanate and 2,6-tolylene-diisocyanate, with a polyol compound selected from the group consisting of polypropylene glycol and polytetramethylene glycol, and
an organic diamine compound selected from the group consisting of 3,5-diethyltoluenediamine and 3,5-dimethylthiotoluenediamine.

9. A shoe press belt for papermaking according to claim 2, wherein:
said aliphatic diol compound ($B1_1$), included in said curing agent (B) and having the active hydrogen group (H), is an aliphatic diol compound selected from the group consisting of ethylene glycol, 1,3-propanediol, 1,4-butanediol, 1,5-pentanediol, 1,6-hexanediol, polyethylene glycol, polypropylene glycol, and polybutylene glycol; and
said aliphatic triol compound (B2) having the active hydrogen group (H) is an aliphatic triol compound selected from the group consisting of trimethylolpropane, propanetriol (glycerin), butanetriol, pentanetriol, hexanetriol, cyclopentanetriol, and cyclohexanetriol.

10. A shoe press belt for papermaking according to claim 2, wherein said organic polyamine compound ($B1_2$), included in said curing agent (B) and having the active hydrogen group (H), comprises a bifunctional organic diamine compound selected from the group consisting of 3,5-diethyltoluene-2,4-diamine, 3,5-diethyltoluene-2,6-diamine, 3,5-dimethylthiotoluene-2,4-diamine, 3,5-dimethylthiotoluene-2,6-diamine, 4,4'-bis(2-chloroaniline), 4,4'-bis(sec-butylamino)-diphenylmethane, N,N'-dialkyldiaminodiphenylmethane, 4,4'-methylenedianiline, 4,4'-methylene-bis(2,3-dichloroaniline), 4,4'-methylene-bis(2-chloroaniline), 4,4'-methylene-bis(2-ethyl-6-methylaniline), trimethylene-bis(4-aminobenzoate), poly(tetramethylene oxide)-di-p-aminobenzoate, phenylenediamine, polyetherdiamine, isophorone diamine, 4,4'-methylene-bis(2-methylcyclohexane-1-amine), 4,4'-methylene-bis(cyclohexaneamine), bis(aminomethyl)cyclohexane, and xylenediamine.

11. A shoe press belt for papermaking according to claim 2, wherein said organic polyamine compound ($B1_2$), included in said curing agent (B) and having the active hydrogen group (H), comprises an at least tri-functional organic polyamine compound selected from the group consisting of iminobispropylamine, bis(hexamethylene)triamine, triethylenetetramine, tetraethylenepentamine, pentaethylenehexamine, dipropylenetriamine, aminoethylethanolamine, tri(methylamino)hexane, and melamine.

12. A shoe press belt for papermaking according to claim 2, comprising a reinforcing fiber base and a polyurethane layer which are integral with each other, said reinforcing fiber base being embedded in said polyurethane layer, said polyurethane layer comprising an outer circumferential polyurethane layer and an inner circumferential polyurethane layer, wherein:
said outer circumferential polyurethane layer is made of said polyurethane layer obtained by curing a mixed composition of said urethane prepolymer (A) and said curing agent (B); and
said inner circumferential polyurethane layer is made of
a polyurethane layer produced by curing a composition comprising
a terminal isocyanate group-containing urethane prepolymer obtained by reacting 4,4'-methylene-bis(phenyl isocyanate) with a polyol compound selected from the group consisting of polypropylene glycol, polytetramethylene glycol and polycarbonate diol, and
a curing agent selected from the group consisting of 3,5-diethyltoluenediamine, 3,5-dimethylthiotoluenediamine, and 1,4-butanediol; or
a polyurethane layer produced by curing a composition comprising
a terminal isocyanate group-containing urethane prepolymer obtained by reacting a polyisocyanate compound selected from the group consisting of 2,4-tolylene-diisocyanate, and 2,6-tolylene-diisocyanate with a polyol compound selected from the group consisting of polypropylene glycol, and polytetramethylene glycol, and
an organic diamine compound selected from the group consisting of 3,5-diethyltoluenediamine, and 3,5-dimethylthiotoluenediamine.

13. A shoe press belt for papermaking according to claim 2, comprising a reinforcing fiber base and a polyurethane layer which are integral with each other, said reinforcing fiber base being embedded in said polyurethane layer, said polyurethane layer comprising an outer circumferential polyurethane layer, an intermediate polyurethane layer and an inner circumferential polyurethane layer, and said outer circumferential polyurethane layer and said inner circumferential polyurethane layer being disposed on respective sides of said intermediate polyurethane layer, wherein:
said outer circumferential polyurethane layer is made of said polyurethane layer obtained by curing a mixed composition of said urethane prepolymer (A) and said curing agent (B);
said reinforcing fiber base is embedded in said intermediate polyurethane layer; and
said intermediate polyurethane layer and said inner circumferential polyurethane layer are made of
a polyurethane layer produced by curing a composition comprising
a terminal isocyanate group-containing urethane prepolymer obtained by reacting 4,4'-methylene-bis(phenyl isocyanate) with a polyol compound selected from the group consisting of polypropylene glycol, polytetramethylene glycol, and polycarbonate diol, and a curing agent selected from the group consisting of 3,5-diethyltoluenediamine, 3,5-dimethylthiotoluenediamine, and 1,4-butanediol; or a polyurethane layer produced by curing a composition comprising a terminal isocyanate group-containing urethane prepolymer obtained by reacting a polyisocyanate compound selected from the group consisting of 2,4-tolylene-diisocyanate and 2,6-tolylene-diisocyanate, with a polyol compound selected from the group consisting of polypropylene glycol and polytetramethylene glycol, and an organic diamine compound selected from the group consisting of 3,5-diethyltoluenediamine and 3,5-dimethylthiotoluenediamine.

14. A shoe press belt for papermaking according to claim 2, comprising a reinforcing fiber base and a polyurethane layer which are integral with each other, said reinforcing fiber base being embedded in said polyurethane layer, and said polyurethane layer comprising an outer circumferential polyurethane layer and an inner circumferential polyurethane layer, wherein:

said inner circumferential polyurethane layer is made of said polyurethane layer obtained by curing a mixed composition of said urethane prepolymer (A) and said curing agent (B); and said outer circumferential polyurethane layer is made of a polyurethane layer produced by curing a composition comprising a terminal isocyanate group-containing urethane prepolymer obtained by reacting 4,4'-methylene-bis(phenyl isocyanate) with a polyol compound selected from the group consisting of polypropylene glycol, polytetramethylene glycol and polycarbonate diol, and a curing agent selected from the group consisting of 3,5-diethyltoluenediamine, 3,5-dimethylthiotoluenediamine and 1,4-butanediol; or a polyurethane layer produced by curing a composition comprising a terminal isocyanate group-containing urethane prepolymer obtained by reacting a polyisocyanate compound selected from the group consisting of 2,4-tolylene-diisocyanate and 2,6-tolylene-diisocyanate, with a polyol compound selected from the group consisting of polypropylene glycol and polytetramethylene glycol, and an organic diamine compound selected from the group consisting of 3,5-diethyltoluenediamine and 3,5-dimethylthiotoluenediamine.

15. A shoe press belt for papermaking according to claim 1, wherein the urethane prepolymer (A) and the curing agent (B) are mixed such that the equivalent ratio (H/NCO) of the active hydrogen group (H) of the curing agent (B) and the isocyanate group (NCO) of the urethane prepolymer (A) has a value in the range of $0.88 \leq H/NCO \leq 1.12$.

16. A shoe press belt for papermaking according to claim 1, wherein the urethane prepolymer (A) and the curing agent (B) are mixed such that the equivalent ratio (H/NCO) of the active hydrogen group (H) of the curing agent (B) and the isocyanate group (NCO) of the urethane prepolymer (A) has a value in the range of $0.90 \leq H/NCO \leq 0.98$.

17. A shoe press belt for papermaking according to claim 2, wherein the urethane prepolymer (A) and the curing agent (B) are mixed such that the equivalent ratio (H/NCO) of the active hydrogen group (H) of the curing agent (B) and the isocyanate group (NCO) of the urethane prepolymer (A) has a value in the range of $0.88 \leq H/NCO \leq 1.12$.

18. A shoe press belt for papermaking according to claim 2, wherein the urethane prepolymer (A) and the curing agent (B) are mixed such that the equivalent ratio (H/NCO) of the active hydrogen group (H) of the curing agent (B) and the isocyanate group (NCO) of the urethane prepolymer (A) has a value in the range of $0.90 \leq H/NCO \leq 0.98$.

\* \* \* \* \*